United States Patent [19]

Takasaki et al.

[11] Patent Number: 5,754,970
[45] Date of Patent: May 19, 1998

[54] DRIVING FORCE TRANSFER APPARATUS FOR FOUR-WHEEL DRIVE VEHICLE WITH FAIL SAFE STRUCTURE

[75] Inventors: Toshiharu Takasaki, Sagamihara; Tomoyuki Hara, Isehara, both of Japan

[73] Assignee: Nissan Motor Co., Ltd., Yokohama, Japan

[21] Appl. No.: 528,048

[22] Filed: Sep. 14, 1995

[30] Foreign Application Priority Data

Sep. 21, 1994 [JP] Japan .................. 6-226478

[51] Int. Cl.$^6$ ............................. B60K 17/344
[52] U.S. Cl. ............... 701/87; 701/89; 701/69; 180/233; 180/247
[58] Field of Search ............ 364/426.035, 426.033, 364/426.034, 424.098; 477/36, 156, 158; 475/84, 206, 221; 192/103 F, 3.57; 180/233, 247, 197, 249

[56] References Cited

U.S. PATENT DOCUMENTS

| | | | |
|---|---|---|---|
| 4,757,870 | 7/1988 | Torii et al. | 180/233 |
| 4,762,021 | 8/1988 | Teraoka | 74/665 GA |
| 4,854,414 | 8/1989 | Koide et al. | 180/247 |
| 4,866,625 | 9/1989 | Kawamoto et al. | 364/426.035 |
| 4,887,689 | 12/1989 | Naito | 364/424.098 |
| 5,057,062 | 10/1991 | Yamasaki et al. | 475/221 |
| 5,363,938 | 11/1994 | Wilson et al. | 180/233 |
| 5,400,866 | 3/1995 | Wilson et al. | 180/197 |
| 5,492,194 | 2/1996 | McGinn et al. | 364/426.041 |
| 5,501,311 | 3/1996 | Wakahara | 192/85 R |
| 5,522,777 | 6/1996 | Baxter et al. | 477/36 |
| 5,599,075 | 2/1997 | Hara et al. | 303/143 |
| 5,634,530 | 6/1997 | Maekawa et al. | 74/467 |
| 5,644,916 | 7/1997 | Hayasaki | 192/109 F |
| 5,649,459 | 7/1997 | Murakami et al. | 74/665 GE |
| 5,687,824 | 11/1997 | Hara et al. | 192/85 CA |
| 5,699,871 | 12/1997 | Hara et al. | 180/247 |

FOREIGN PATENT DOCUMENTS 5-213086  8/1993  Japan.

*Primary Examiner*—Tan Q. Nguyen
*Attorney, Agent, or Firm*—Foley & Lardner

[57] ABSTRACT

In a driving force transfer apparatus for a part-time four-wheel drive vehicle with a fail safe structure, a high-speed gear range shift position and a low-speed gear range shift position in a high-speed and low-speed gear range position switching mechanism in a sub transmission are determined without special position sensors. In a case where the special position sensors are installed in the transfer apparatus, a shift position sensor diagnosis operation is effected so that a failure in either of a high-speed gear range position or low-speed gear range position sensor can easily be detected. If the failure in either of the position sensor occurs, a hydraulic (oil) pressure supply for providing a clutch pressure for a frictional clutch is made effective. Furthermore, a failure of either of revolution speed sensor detecting a first output axle revolution speed or detecting a second output axle revolution speed can also be detected. The first output axle is connected to mainly driven road wheels. The second output axle is connected to secondarily driven road wheels.

22 Claims, 10 Drawing Sheets

DRIVING FORCE TRANSFER APPARATUS FOR FOUR-WHEEL DRIVE VEHICLE WITH FAIL SAFE STRUCTURE

BACKGROUND OF THE INVENTION

The present invention relates to a driving force transfer apparatus applicable to a four-wheel drive vehicle and having a sub transmission mechanism capable of being switched between a high-speed gear range position and a low-speed gear range position.

A Japanese Patent Application First Publication No. Heisei 5-213086 (published on Aug. 24, 1993) exemplifies a previously proposed vehicular transfer apparatus.

In the previously proposed vehicular transfer apparatus, a driving force transmitted from a main power transmission to an input axle of the transfer apparatus is input to a sub transmission constituted by a planetary gear. The input driving force is, then, transmitted to a mainly driven first output axle (output axle connected toward rear road wheels) via a high-speed gear range position and low-speed gear range position switching mechanism having a coupling sleeve (shift sleeve) which is meshed selectively with a carrier and sun gear in the sub transmission so as to switch between the high-speed and low-gear shifting states. A second output axle (connected toward front road wheels) is coupled to the first output axle via a two-wheel-and-four-wheel drive switching mechanism having a frictional clutch (variable torque clutch). A clutching force (engagement force) of the frictional clutch is varied by supplying a control fluid under a predetermined pressure to the frictional clutch. Usually, when the low-speed gear range position is selected through the high-speed and low-speed gear range piston switching mechanism, a dog clutch structure is installed in the sub transmission whose engaged meshed state causes the second output axle to forcefully couple to the first output axle since it is necessary to secure a four-wheel drive state as a minimum requirement.

Furthermore, a high-speed gear range position detecting switch and a low-speed gear range position detecting switch are provided to detect a switched position in the high-speed and low-speed range position switching mechanism in the sub transmission. When the high-speed gear range position detecting switch is in the off state during the switching from the high-speed gear range position to the low-speed gear range position, a clutch pressure is temporarily in an on state so that the frictional clutch is in an engagement (clutched) state. Thereafter, when the low-speed gear range position switch is in the on state so that the switching into the low-speed gear range position is completed, the clutch pressure is in the off state so that the frictional clutch is in a released (disengaged) state.

Since, in the previously proposed transfer apparatus described above, the high-speed gear range position and the low-speed gear range position through the high-speed gear range position and low-speed gear range position switching mechanism of the sub transmission are individually and separately detected by means of the high-speed and low-speed gear range position detecting switches, such special detecting switches are needed to detect the shifted (moved) position of the shift sleeve in a transfer casing. The number of parts are accordingly increased and cost of manufacturing the transfer apparatus becomes high. In addition, the high-speed gear range position detecting switch detects the high-speed gear range position to which the shift sleeve is moved and the low-speed gear range position detecting switch detects the low-speed gear range position to which the shift sleeve is moved and a clutch pressure for the frictional clutch is controlled on the basis of detection signals of both or either of the detecting switches.

Therefore, for example, suppose that the low-speed gear range position detecting switch still continues in the on state when the gear range position is switched from the low-speed gear range position to the high-speed gear range position. At this time, the off state of the clutch pressure is maintained so that the frictional clutch is maintained in the released (disengaged) state, thus the vehicle remains in a two-wheel drive state (only the rear road wheels are in the driven road wheel state). Hence, when the vehicle runs on a rugged road or a low friction coefficient road such as a snowy road or frozen road, the vehicle remains in the two-wheel drive state in spite of the fact that a vehicular driver desires for the vehicle to be in a four-wheel drive state.

SUMMARY OF THE INVENTION

It is, therefore, a main object of the present invention to provide a vehicular driving force transfer apparatus for a four-wheel drive vehicle which can facilitate an assured detection of the high-speed gear range position and the low-speed gear range position by means of the high-speed and low-speed gear range position switching mechanism in a sub transmission without special detectors for the high-speed and low-speed gear range positions, and which can easily detect failure in the special detectors or can achieve failure countermeasure even if the special detectors are installed.

The above-described object can be achieved by providing a driving force transfer apparatus for a four-wheel drive vehicle, comprising: a) a power transmission associated with a vehicular engine; b) an input axle connected to an output axle of said power transmission; c) a first output axle connected toward mainly driven road wheels of the vehicle; d) a second output axle connected toward secondarily driven road wheels of the vehicle; e) a sub transmission having a low-speed gear range position and high-speed gear range position switching mechanism and which is so arranged and constructed as to transmit a driving force transmitted from said power transmission to said first output axle through mesh clutching means provided in said low-speed gear range position and high-speed gear range position switching mechanism; f) a two-wheel-to-four-wheel drive switching mechanism having a frictional clutch and which is so arranged and constructed as to provide a clutching force for said frictional clutch so that said second output axle is coupled to said first output axle, the clutching force of said frictional clutch being varied according to a magnitude of clutch pressure applied to said frictional clutch; g) revolution speed difference detecting means for detecting a difference in revolution speed between the driven and non-driven road wheels; and h) clutching force controlling means for controlling the clutch pressure applied to said frictional clutch so that the clutching force of said frictional clutch is varied on the basis of the difference in revolution speed between driven and non-driven road wheels detected by said revolution speed difference detecting means, wherein said revolution speed difference detecting means comprises: i) first output axle revolution speed detecting means for detecting an input axle of said sub transmission and outputting a first signal indicating that the revolution speed of said input axle of said sub transmission as a first output axle revolution speed indicative signal; j) second output axle revolution speed detecting means for detecting a revolution speed of said second output axle and outputting a second signal indicating the revolution speed of said second output axle, and which further includes a high-speed gear range position or low-speed gear range position determining means for determining whether the sub transmission is in a state of either of a high-speed gear range or low-speed gear range position on the basis of values of said first and second signals output from said first and second output axle revolution speed detecting means.

BEST MODE FOR CARRYING OUT THE INVENTION

Reference will hereinafter be made to the drawings in order to facilitate a better understanding of the present invention.

Figure 1:
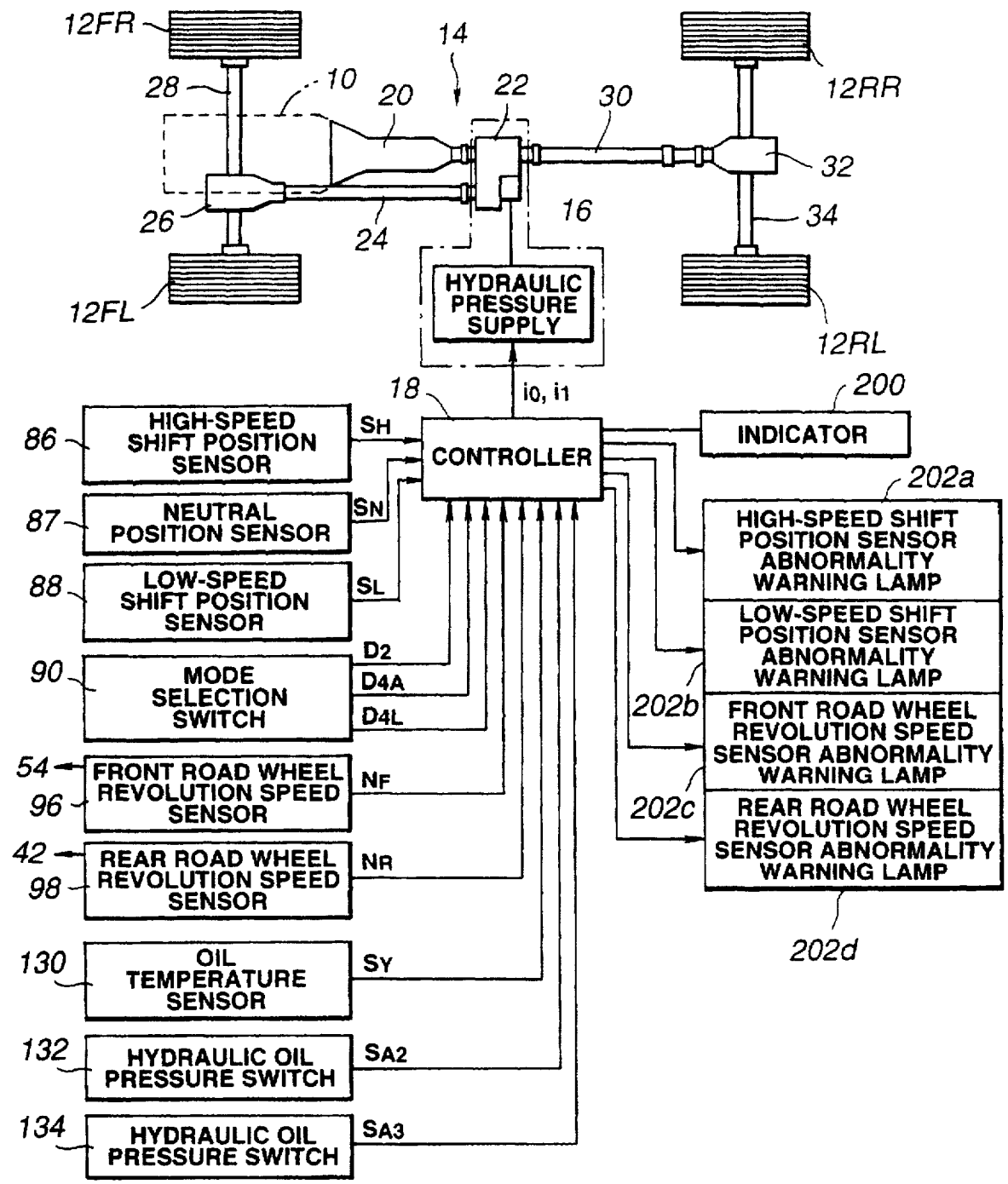
FIG. 1 is a circuit block diagram of a driving force transfer apparatus in a preferred embodiment and is an explanatory view to which the driving force transfer apparatus in the preferred embodiment according to the present invention is applicable to a part-time, four-wheel drive vehicle.

FIG. 1 shows a part-time four-wheel drive vehicle based on an FR (Front Engine, Rear Drive) type to which a vehicular driving force transfer apparatus according to the present invention is applicable. The vehicle shown in FIG. 1 includes: an engine (internal combustion engine) 10 as a driving source, front left, front right, rear left, and rear right road wheels 12FL through 12RR; a driving force transfer system 14 into which a driving force is transmitted from the engine 10 and by which the transmitted driving force is variably distributed to the four road wheels by a variable torque (driving force) distribution ratio; a hydraulic (oil) pressure supply 16 which supplies a hydraulic (oil) pressure so as to control the driving force distribution by means of the driving force transfer system 14; and a controller 18 which controls the hydraulic pressure supply 16.

The driving force transfer system 14 includes: a power transmission 20, associated with the engine 10, which shifts the driving force by a selected gear ratio; and a transfer 22 which serves to distribute the driving force transmitted from the power transmission to the front road wheels 12FL and 12FR (usually, non-driven, that is to say, secondarily driven wheels) and rear road wheels 12RL and 12RR (so-called, always driven wheels, that is to say, mainly driven wheels) in this type of the four-wheel vehicle shown in FIG. 1. In the driving force transfer system 14, a front road wheel driving force distributed by the transfer 22 is transmitted to the front left and right road wheels 12FL and 12FR via a front road wheel connected output axle 24, a front differential gear 26, and a front road wheel side drive shaft 28. On the other hand, a rear road wheel driving force from the transfer 22 is transmitted to the rear left and right road wheels 12RL and 12RR via a propeller shaft (rear road wheel connected output axle) 30, a rear differential gear 32, and a drive shaft 34. The controller 18 will be described later.

Figure 2:
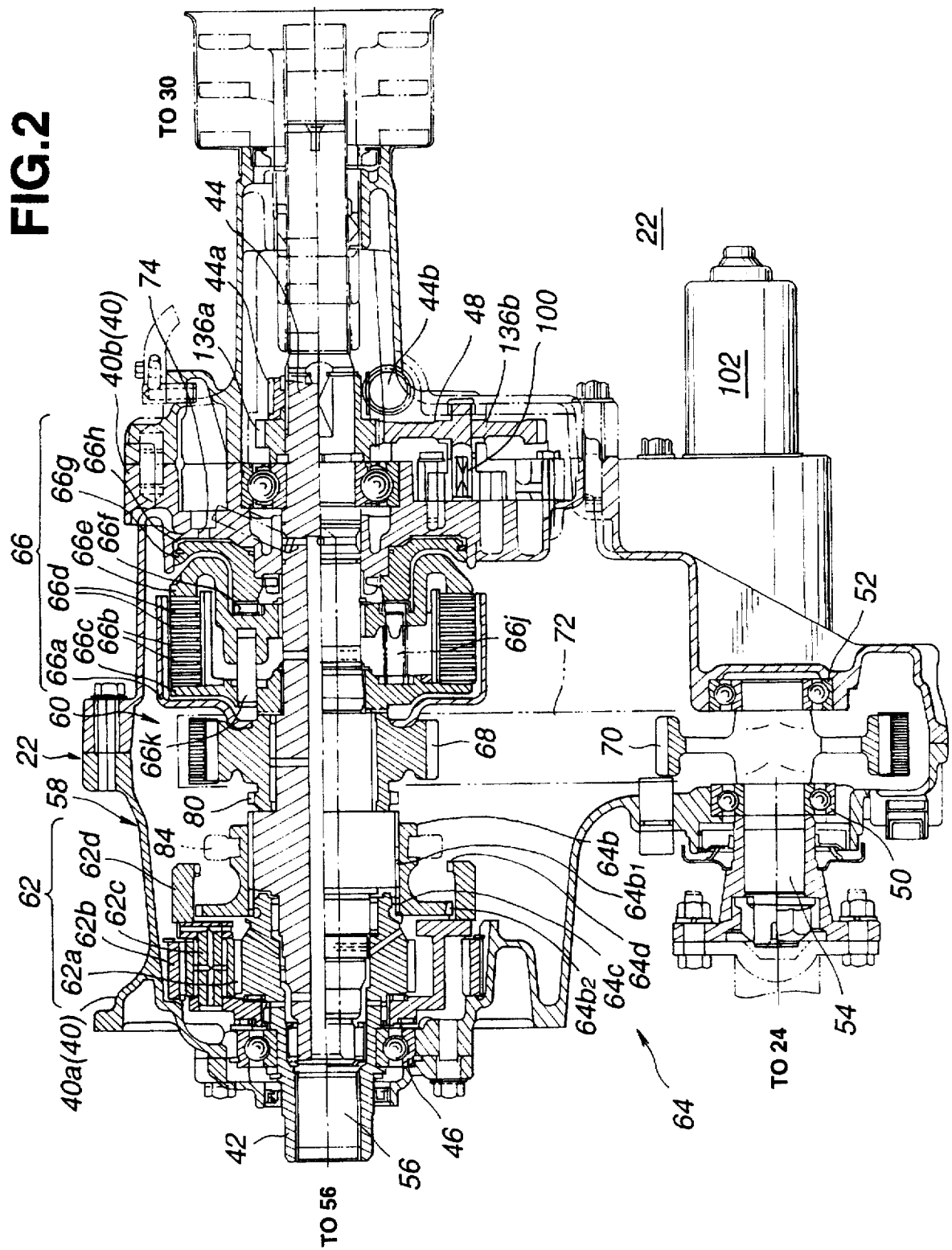
FIG. 2 is an explanatory view for explaining an internal structure of a transfer to which the driving force transfer apparatus in the preferred embodiment is applicable.
Figure 3:
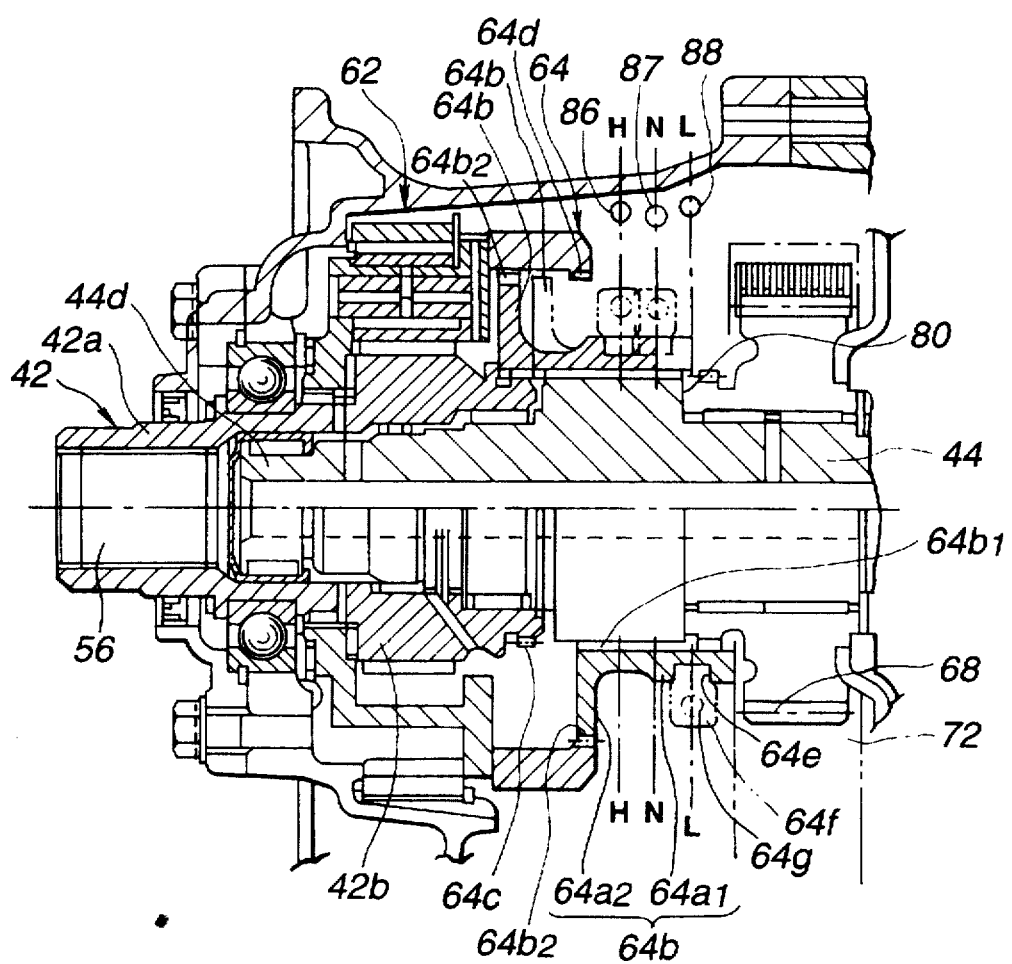
FIG. 3 is an explanatory view for explaining the internal structure of the transfer and slide motion of a shift sleeve in a sub transmission to which the driving force transfer apparatus in the preferred embodiment is applicable.

FIGS. 2 and 3 show an internal structure of the transfer 22.

In a transfer casing 40, an input axle 42 is coaxially disposed therein with a first output axle 44. One end of the input axle 42 is faced with a corresponding end of the first output axle 44. The input axle 42 is rotatably supported by a front casing 40a via a radial bearing 46. The first output axle 44 is rotatably supported by a rear casing 40b via a radial bearing 48 so that both of the input axle 42 and first output axle 44 are relatively revolvable.

Referring to FIG. 2, in parallel to these input axle 42 and first output axle 44, a second output axle 54 is rotatably supported via respective bearings 50 and 52 disposed within the front casing 40a and the rear casing 40b. It is noted that the input axle 42 is coupled to an output axle 56 of the transmission 20, the first output axle 44 is coupled to the rear road wheel connected output axle 30, and the second output axle 54 is coupled to the front road wheel connected output axle 24, respectively.

Referring again to FIG. 2, a sub transmission (mechanism) 58 is disposed between the input axle 42 and the first output axle 44. A two-wheel-and-four-wheel drive switching mechanism is disposed between the first output axle 44 and second output axle 54.

The sub transmission (mechanism) 58 includes: a planetary gear mechanism 62; and a high-speed (gear range) position and a low-speed (gear range) position switching mechanism 64 of a clutch meshing type coaxially disposed on the planetary gear mechanism 62.

The planetary gear mechanism 62 includes: a sun gear 62a formed on an outer periphery of the input axle 42; an internal gear 62b fixed into an inside of the front casing 40a; a pinion gear 62c meshed with these sun gear 62a and internal gear 62b; and a pinion carrier 62d rotatably supporting the pinion gear 62c.

The high-speed gear range position and low-speed gear range position switching mechanism 64 includes: a shift sleeve 64b, which is slidably disposed in an axial direction of the first output axle 44, having a cylindrical portion 64a₁ including a spline hole 64b₁ to be engaged with a spline axle portion formed on an outer periphery of the first output axle 44 and a flange portion 64a₂ formed integrally onto a left-sided end of the cylindrical portion 64a₁ and on an outer periphery of which outer tooth 64b₂ are formed; a high-speed shifting gear 64c formed at an outer peripheral position of the input axle 42 and is enabled to be meshed with the spline hole 64b₁ of the shift sleeve 64b; and a low-speed shifting gear formed on an inner periphery of the pinion carrier 62d and which is enabled to be meshed with the outer tooth 64b₂ of the shift sleeve 64b (refer to FIG. 2).

A fork 64g integrally formed on a fork rod 64f disposed so as to be slidable in a left-and-right sided direction as viewed from FIG. 3 is engaged with a peripheral groove 64e formed on an outer peripheral surface of a right-sided end of the cylindrical portion 64a₁ of the shift sleeve 64b, as shown in FIG. 3.

The fork rod 64f is linked via a linkage mechanism (not shown) to a sub transmission lever. The lever of the sub transmission is disposed on a part of a vehicle compartment near to a driver's seat. The lever is straight selectable between a four-wheel drive high-speed gear range (hereinafter, abbreviated as 4H range), a neutral range (hereinafter, abbreviated as N range), and a four-wheel-drive low-speed gear range (hereinafter, abbreviated as 4L range).

When the sub transmission lever is operated to select the 4H range, the spline hole 64b₁ is meshed with the high-speed gear range 64c so as to be moved to the high-speed gear shift (range) position H at which the driving force transmitted to the input axle 42 is directly transmitted to the first output axle 44. From this state, when the lever of the sub transmission 58 is operated to select the N range, the spline hole 64b₁ is spaced apart from both of the high-speed shifting gear 64c and the four-wheel driving gear 80 so that the spline hole 64b₁ is moved to a neutral position N at which the coupling between the input axle 42 and first output axle 44 is released. Furthermore, when the lever of the sub transmission 58 is operated to select the 4L range, the spline hole 64b₁ is out of mesh with the high-speed shifting gear 64c as a lower side disposition of the shift sleeve 64b shown in FIG. 3, the outer tooth 64b₂ are meshed with the low-speed shifting gear 64d in place of the out-of mesh described above and the spline hole 64b₁ is moved to the low-speed gear range (shift) position L at which the spline hole 64b₁ is meshed with four-wheel driving gear 80 formed on a first sprocket 68 (as will be described later).

Referring back to FIG. 6, the two-wheel-and-four-wheel drive switching mechanism 60 includes: a wet-type multi-plate frictional clutch (hereinafter, abbreviated as a frictional clutch) which modifies a driving force (torque) distribution ratio of the front road wheels 12FL and 12FR to the rear road wheels 12RL and 12RR (as will be described later); the first sprocket 68 which is rotatably disposed on the first output axle 44; a second sprocket 70 which is coaxially coupled to the second output axle 54; and a chain 72 wound between the first and second sprockets 68 and 70.

The frictional clutch 66 includes: a clutch drum 66a coupled with the first sprocket 68; friction plates 66b which are spline coupled to the clutch drum 66a; a clutch hub 66c which is spline coupled to an outer periphery of the first input axle 44; friction discs 66d disposed between the mutually facing friction plates, integrally coupled to the clutch hub 66c; a rotary member 66e disposed on an outer periphery of the first output axle 44 so as to bring the friction plates 66b and friction discs 66d into contact with one another according to an axial movement thereof toward the clutch drum 66a; a pin 66k integrally coupled to the clutch hub 66c so as to engage the clutch hub 66c with the rotary member 66e; a clutch piston 66g installed on an inner wall of the rear casing 40b so as to be movable in the axial direction thereof; a thrust bearing 66f which transmits the axial movement of the clutch piston 66g to the rotary member 66e; a cylinder chamber 66h formed on the inner wall between the clutch piston 66g and the rear casing 40b; and a return spring 66j which provides a biasing force thereof for the rotary member 66e toward the clutch piston 66g.

Then, when a clutch pressure $P_c$ is supplied from the hydraulic (oil) pressure supply 16 (a detailed circuit structure thereof will be described later) to an input port 74 formed on the rear casing 40b communicated with the cylinder chamber 66h, the clutch piston 66g is moved toward a left-handed direction as viewed from FIG. 2 due to a generation of pressure within the cylinder chamber 66h so that the movement of the clutch piston 66g is transmitted to the rotary member 66e via the thrust bearing 66f. Thus, the friction plates 66b and the friction discs 66d mutually spaced apart are brought in contact with one another and an engaging force (or clutching force) due to frictional forces is given to the frictional clutch 66 according to a value of the clutch pressure $P_c$. Therefore, the driving force of the first output axle 44 is transmitted to the second output axle 54 via the first sprocket 68, the chain 72, and the second sprocket 70 at a required torque (driving force) distribution ratio which accords with the clutching force exerted by he frictional clutch 66.

In addition, when the supplied clutch pressure $P_c$ is reduced so that the biasing force of the return spring 66j causes the rotary member 66e and the clutch piston 66g to move toward a right-handed direction as viewed from FIG. 2 and, therefore, both of the friction plates 66b and friction discs 66d are mutually spaced apart, the driving force of the first output axle 44 is not transmitted to the second output axle 54.

It is noted that the four-wheel driving gear 80 is disposed on the first sprocket 68 faced toward the outer periphery of the shift sleeve 64b. As described above, when the shift sleeve 64d is moved up to the low-speed shifting position L shown in FIG. 3, the spline hole 64b₁ is meshed with the four-wheel driving gear 80 so that the first output axle 44 is forcefully coupled to the second output axle 54. Thus, the shift sleeve 64b and the four-wheel driving gear 80 constitute a dog clutch which forcefully couples the first output axle 44 and the second output axle 54 to force the vehicle into the four-wheel drive state at the low-speed gear range position L.

Furthermore, as shown in FIG. 3, a high-speed gear range (shift) position sensor 86 which detects that the shift sleeve 64b has slided to the high-speed gear range (shift) position H, a neutral position sensor 87 which detects that the shift sleeve 64b has slided at the neutral position N, and a low-speed gear range shift position sensor 88 which detects that the shift sleeve 64b has slided to the low-speed gear range shift position L are disposed within the front casing 40a. Then, detection signals (on or off) $S_H$, $S_L$ and $S_N$ indicating that the shift sleeve 64b has slided to the high-speed gear range shift position H, that the shift sleeve 64b has moved to the neutral position N, and that the shift sleeve 64b has slided to the low-speed gear range shift position L from the respective high-speed, neutral position, and low-speed gear range position sensors 86, 87, and 88 are input to the controller 18, as will be described later.

Figure 4:
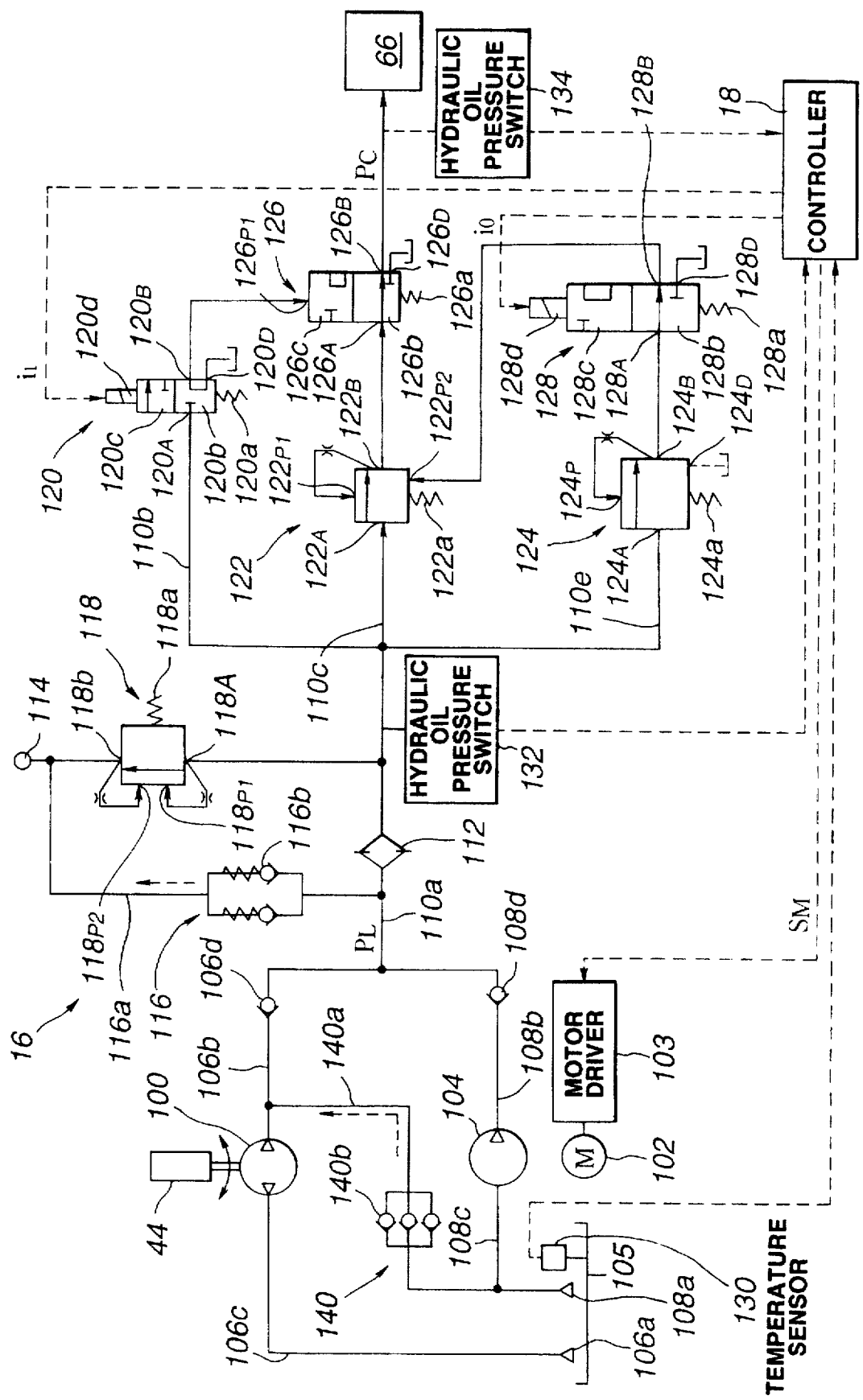
FIG. 4 is a circuit block diagram of a hydraulic (Oil) pressure supply shown in FIG. 1.

Next, FIG. 4 shows a hydraulic and electric circuit block diagram of the hydraulic (oil) pressure supply (circuit) 16 shown in FIG. 1.

As described above, the hydraulic (oil) pressure supply 16 serves to supply the required clutch pressure $P_c$ to an input port 74 of the transfer 22.

The hydraulic (oil) pressure supply 16 includes a hydraulic (oil) pressure source having a reversibly rotatable main pump 100 which is directly coupled to the first output axle 44 so as to be driven to rotate with the first output axle 44 and a normal direction (usually clockwise direction, non-reversible) rotating type sub pump 104, disposed in parallel to the main pump 100 so as to be driven to rotate with an electric motor (sub motor) 102 as a power source.

The main pump 100 and sub pump 104 suck in a working fluid (oil) reserved within an oil tank 105 and drain it to pipes 106b and 108b at drain sides of these pumps 100 and 104. A converging pipe 110a converging the pipes 106b and 108b is connected with an oil element 112. One end of a relief passage 116 is connected to an upstream side (toward the main pump 100 and sub pump 104) of the oil element 112. The other end of the relief passage 116 is connected to a lubricating system 114. A line pressure regulating valve 118 is connected to a downstream side of the oil element 112. Input sides of an electromagnetic open/closure (on-off switching) valve 120, a clutch pressure regulating valve 122, and a pressure reducing valve 124 are connected, respectively, to a pipe 110b, a pipe 110c, and a pipe 110e, each pipe 110b, 110c, and 110e being branched from the converging pipe 110a. In addition, an output end of the clutch pressure regulating valve 122 is connected to an input end of a pilot switching valve 126. The pilot switching valve 126 serves to finally supply the clutch pressure $P_c$ to the transfer 22 via the input port 74 when a pilot pressure is supplied from the electromagnetic on-off switching valve 120. An output end of the pressure reducing valve 124 is connected to an input side of a duty ratio control electromagnetic valve 128. It is noted that a temperature sensor 130 is disposed which detects a temperature of the working oil within the oil tank 105. A hydraulic oil pressure switch 132 is disposed on the pipe located at the downstream of the oil element 112 to detect working oil pressure reduced by means of the line pressure regulating valve 118. In addition, another (hydraulic) oil pressure switch 134 is disposed on a pipe in which the clutch pressure Pc is derived from the pilot switching valve 126. These detection signals of the three temperature and pressure switches 130, 132, and 134 are supplied to the controller 18.

The hydraulic oil pressure supply 16 shown in FIG. 4 is, in the actual vehicle, disposed within the transfer 22. The main pump 100 which sucks the working oil from the oil tank 105 is linked to the first output axle 44 via a first gear 136a and a second gear 136b as shown in FIG. 2. The sub pump 104 is linked to the electric motor 102 externally mounted on the rear casing 40b of the transfer 22.

Each component of the hydraulic oil supply 16 will be described in details with reference to FIG. 4.

The reversible main pump 100 sucks in the working oil from the oil tank 105 via a strainer 106a connected to one end of a sucking pipe 106c. The sub pump 104 sucks in the working oil from the oil tank 105 via the strainer 108a connected to the end of a sucking pipe 108c. Check valves 106d and 108d are interposed in drain pipes 106b and 108b of each pump connected to the converging pipe 110a. A bypass passage 140 is connected between the sucking pipe 106b of the main pump 100 and sucking pipe 108c of the sub pump 104. The bypass passage 140 is constituted by a bypass pipe 140a, with three parallel disposed check valves 140b interposed in the bypass pipe 140a. When the drain pipe 106b is under a negative pressure, the check valve 140b is open so as to provide a communication passage such that the working oil streams in a dotted arrow-marked direction.

The relief passage 116 connected to the part of the converging pipe 110a located upstream with respect to the oil element 112 includes: a relief pipe 116a the other end of which is connected to the lubricating system 114; and two-parallel connected spring equipped check valves 116b interposed in the relief pipe 116a. If a clog in a filter constituting the oil element 112 occurs so that the pressure at the upstream side of the oil element 112 indicates a predetermined pressure value or higher, the check valve 116b is opened so as to provide a communication passage in which the working oil streams in a dotted arrow-marked direction.

The line pressure regulating valve 118 is constituted by an inner pilot and spring type pressure reducing valve. In details, the line pressure regulating valve 118 includes: a cylindrical valve housing having an input port $118_A$ connected to the converging pipe 110a, an output port $118_B$ connected to the lubricating system 114, and inner pilot ports $118_{p1}$ and $118_{p2}$ to which primary pressure and secondary pressure are supplied via a fixed throttling; a spool slidably disposed within the cylindrical valve housing; and a return spring 118a installed within the cylindrical valve housing and whose biasing force is applied to one end of the spool. A supply pressure $P_L$ boosted by means of the main pump 100 or sub pump 104 is reduced to a predetermined pressure by means of the line pressure regulating valve 118, the reduced pressure by means of the line pressure regulating valve 118 being supplied to the electromagnetic on-off switching valve 120, the clutch pressure regulating valve 122, and the pressure reducing valve 124. It is noted that the working oil streamed out of the output port $118_B$ when the reducing of the pressure is set is returned to the lubricating system.

The clutch pressure regulating valve 122 is constituted by an inner-pilot-and-outer-pilot and spring type pressure regulating valve. The clutch pressure regulating valve 122 includes: a cylindrical valve housing having an input port $122_A$ connected to the pipe 110c, an output port $122_B$ connected to the pilot switching valve 126, an inner pilot port $122_{p1}$ to which the secondary pressure is supplied via a fixed throttling as a pilot pressure, and an outer pilot port $122_{p2}$ to which a controlled pressure is supplied from the duty ratio control electromagnetic valve 128; a spool slidably disposed within the cylindrical valve housing thereof; and a return spring whose biasing force is applied to one end of the spool.

The clutch pressure regulating valve 122 closes the communication passage between the input port $122_A$ and the output port $122_B$ so that the secondary pressure is not output via the output port $122_B$ in a case where the control pressure is not supplied from the duty ratio control electromagnetic valve 128. However, in a case where a pilot control pressure is supplied from the duty ratio control electromagnetic valve 128, the spool is moved under its control so that the secondary pressure which accords with the pilot control pressure is output as the clutch pressure Pc.

The pressure reducing valve 124 is constituted by an inner-pilot and spring-type secondary pressure constant type pressure reducing valve.

The pressure reducing valve 124 includes: a cylindrical valve housing having an input port $124_A$ connected to the pipe 110e, an output port $124_B$ connected to the duty ratio control electromagnetic valve 128, an inner pilot port $124_P$ to which the secondary pressure from the output port $124_B$ is supplied via a fixed throttling as the pilot pressure, and a drain port $124_H$; a spool slidably disposed within the cylindrical valve housing; and a return spring 124a whose biasing force is applied to one end of the spool. Then, when the spool of the pressure reducing valve 124 is moved to a predetermined position by means of the pilot pressure supplied to the inner pilot port $124_P$, the primary pressure supplied from the input port $124_A$ is supplied to the duty ratio control electromagnetic valve 128 as the control pressure whose pressure value is reduced to the predetermined pressure.

The duty ratio control electromagnetic valve 128 is constituted by a three-port, two-position type valve. The duty ratio control electromagnetic valve 128 includes: an input port $128_A$ connected to the pressure reducing valve 124; a drain port $128_R$ connected to its drain end; an output port $128_B$ connected to the outer pilot port $122_{p2}$ of the clutch pressure regulating valve 122; and a return spring 127a. A spool disposed within the valve 128 is controllably moved between a normal position 128b at which the spool serves to communicate the output port $128_B$ and the drain port $128_R$ and an operation position 128c at which the spool serves to communicate the input port $128_A$ and the output port $128_B$.

An energizing (exciting) current $i_0$ having the required duty ratio related thereto is supplied from the controller 18 to the solenoid 128d. At this time, the spool is moved from its normal position to its operation position 128c against the biasing force of the return spring 128a during an interval at which the exciting current $i_0$ is in an on state (active state) so that the pilot control pressure according to the duty ratio related to the exciting current $i_0$ is output to the clutch pressure regulating valve 122. Hence, when the control pressure is supplied from the clutch pressure regulating valve 122 to the outer pilot port $122_{P2}$, the clutch pressure $P_c$ according to the pilot control pressure is drained. Thus, when the engaging (clutching) force of the frictional clutch 66 is controlled according to the clutch pressure Pc, the distribution of the driving torque according to the clutch pressure $P_c$ toward the front road wheels is carried out.

The electromagnetic switching valve 120 of a spring offset type is constituted by a three-port, two-position type. The electromagnetic switching valve 120 includes: an input port $120_A$ to which the line pressure is supplied; an output port $120_B$ to which the outer pilot port $126_{p1}$ of the pilot switching valve 126 is connected; and a drain port $120_D$. The electromagnetic switching valve 120 is provided with a valve housing in which a spool is controllably moved between a normal position 120b at which the spool serves to interrupt the input port $120_A$ and to communicate the output port $120_B$ to the drain port $120_D$ and an operation position 120c at which the spool serves to communicate the input port $120_A$ with the output port 120a and to interrupt the drain port $120_D$. The solenoid 120d in the electromagnetic switching valve 120 receives the exciting current $i_1$ from the controller 18. At this time, during the on state of the exciting current $i_1$, the spool is controllably moved to the operation position 120c against the biasing force of the return spring 120a so that the pilot control pressure is supplied to the external pilot port $126_{p1}$ of the pilot switching valve 126. In addition, when the exciting current $i_1$ from the controller 18 is in the off state, the biasing pressure from the return spring 120a causes the spool to be returned to the normal position 120b. At this time, the pilot control pressure supplied to the external pilot port $126_{p1}$ is eliminated through the drain port $120_D$.

Figure 5:
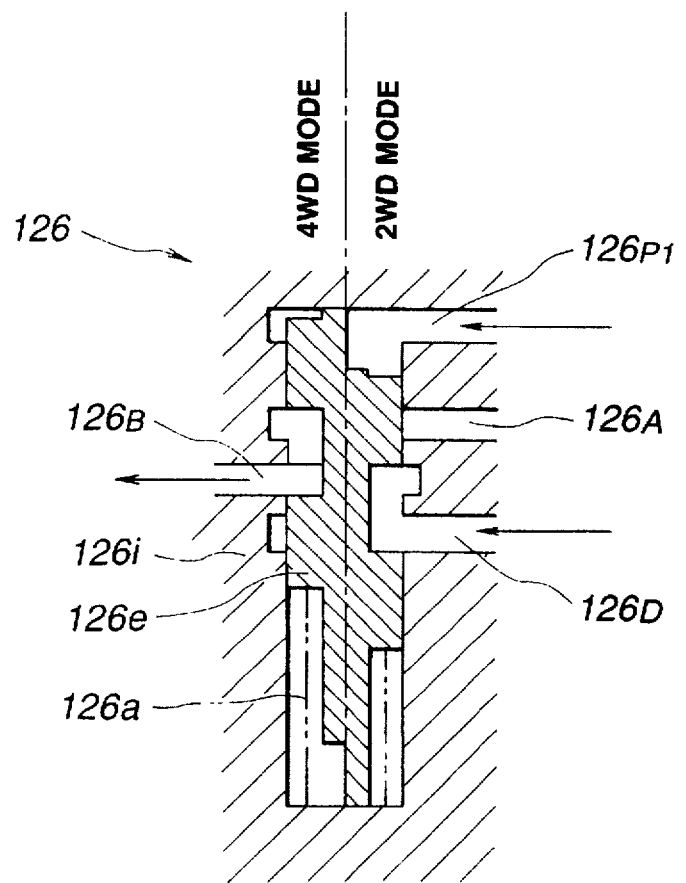
FIG. 5 is an explanatory view for explaining states in a two-wheel drive mode and in a four-wheel drive mode of a switching valve (126) used in the hydraulic pressure supply.

In addition, as also shown in FIG. 5, the pilot switching valve 126 is a valve including: an input port $126_A$ to which the secondary pressure from the clutch pressure regulating valve 122 is supplied; an output port $126_B$ via which the secondary pressure is supplied to the transfer 22; an external pilot port $126_{p1}$ to which the control pressure is supplied when the solenoid 120d of the electromagnetic switching valve 120 is in a power supplied state; and a drain port $126_H$. A spool 126e is slidably disposed within a cylindrical valve housing 126i of the pilot switching valve 126. A return spring 126a is disposed within the valve housing so that the spool 126e is biased toward one end direction of the spool 126a.

The spool 126e of the pilot switching valve 126 serves to interrupt between both of the input port $126_A$ and output port $126_B$ in a case where the pilot control pressure is not supplied to the external pilot port $126_{p1}$. At the same time, the spool 126e is moved so that the output port $126_B$ is communicated with the drain port $126_D$ in a 2-WD (two (left and right) driven road wheels are in the mainly driven wheels, two-wheel drive) mode position 126b (left half cross sectioned state of FIG. 5).

In addition, when the solenoid 120d of the electromagnetic switching valve 120 is in the on state through the exciting current $i_1$ (energized state), the spool of the electromagnetic switching valve 120 is moved to a second position 120c (refer to FIG. 4) with the solenoid 120d of the electromagnetic switching valve 120 turned on so that the control pressure is supplied to the external pilot port $126_{p1}$, thereby, both of the input port $126_A$ and output port $126_B$ being communicated with each other (so called, 4-WD (four-wheel drive) mode position 126c (right half cross sectioned state of FIG. 10)).

In this way, the pilot control pressure from the electromagnetic on-off switching valve 120 drives the pilot switching valve 126 so that the spool 126e of the pilot switching valve 126 can be driven to move under the highly pressurized pilot control pressure. Thus, if dust, chips, or so on is adhered onto a sliding passage of the spool 126e so that, even if a slide resistance on the spool 126e is enlarged, the slide motion of the spool 126e can be assured.

On the other hand, referring back to FIG. 1, a mode selection switch 90 is disposed in a part of the vehicle compartment near to the driver's seat so as to select either of the two-wheel drive mode and four-wheel drive mode therethrough. The mode selection switch 90 is constituted so as to select three modes, namely, the two-wheel drive mode, a four-wheel drive automatic mode, and a four-wheel drive lock mode. In the four-wheel drive automatic mode, the torque distribution ratio toward the front road wheels 12FL and 12FR is varied from 0% to 50%. In the four-wheel drive lock mode, the torque distribution ratio toward the front road wheels 12FL and 12FR are fixed to 50%.

As shown in FIG. 1, a selection signal $D_2$ is in the on state when the two-wheel drive mode is selected from the mode selection switch 90 and is supplied to the controller 18. A selection signal $D_{4A}$ is in the on state when the four-wheel drive automatic mode is selected from the switch 90 and is supplied to the controller 18. A selection signal $D_{4L}$ is in the on state when the four-wheel drive lock mode is selected from the switch 90 and is supplied to the controller 18.

Furthermore, a front road wheel side revolution speed sensor 96 is disposed on the second output axle 54 so as to detect the revolution speed of the second output axle 54. A rear road wheel side revolution speed sensor 98 is disposed on the input axle 42 of the sub transmission 58 so as to detect the revolution speed of the input axle of the sub transmission as the revolution speed of the first output axle 44. The detected values $N_F$ and $N_R$ from the revolution speed sensors 96 and 98 are supplied to the controller 18.

It is noted that as the revolution speed sensor 98, a well known revolution speed sensor to detect the output axle of the power transmission 20 may be used.

The controller 18 receives detection signals from the high-speed (gear range shift) position sensor 86, the neutral position sensor 87, the low-speed gear range shift position sensor 88, the two-wheel drive (2 WD) to four-wheel (4WD) mode selection switch 90, the front road wheel side revolution speed sensor 96, and the rear road wheel side revolution speed sensor 98 and outputs the exciting currents $i_0$ and $i_1$ to the hydraulic oil pressure supply 16 on the basis of the above-described detection signals.

In addition, the controller 18 outputs a shift position indicative signal $S_n$ representing the shift position of the high-speed gear range position and low-speed gear range position switching mechanism 64 to an indicator 200 disposed on, for example, an instrument panel, diagnoses whether the high-speed gear range position sensor 86, the low-speed gear range position sensor 88, the front road wheel side revolution speed sensor 96, and the rear road wheel side revolution speed sensor 98 are normally operated, and outputs warning signals $A_{SH}$, $A_{SL}$, $A_{NF}$, and $A_{NR}$ to corresponding abnormality indicating lamps 202a, 102b, 202c, and 202d, respectively, if the diagnosis results indicate failures in the sensors described above.

In the embodiment, the controller 18 performs the control to enable a maintenance of a required line pressure in the hydraulic (oil) pressure supply 16. Therefore, the required oil temperature sensor 130 and hydraulic oil switches 132 and 134 are installed. A motor control signal $S_M$ based on the detection signals from these sensors in the hydraulic oil pressure supply 16 is also output from the controller 18 to the hydraulic (oil) pressure supply 16.

Figure 6:
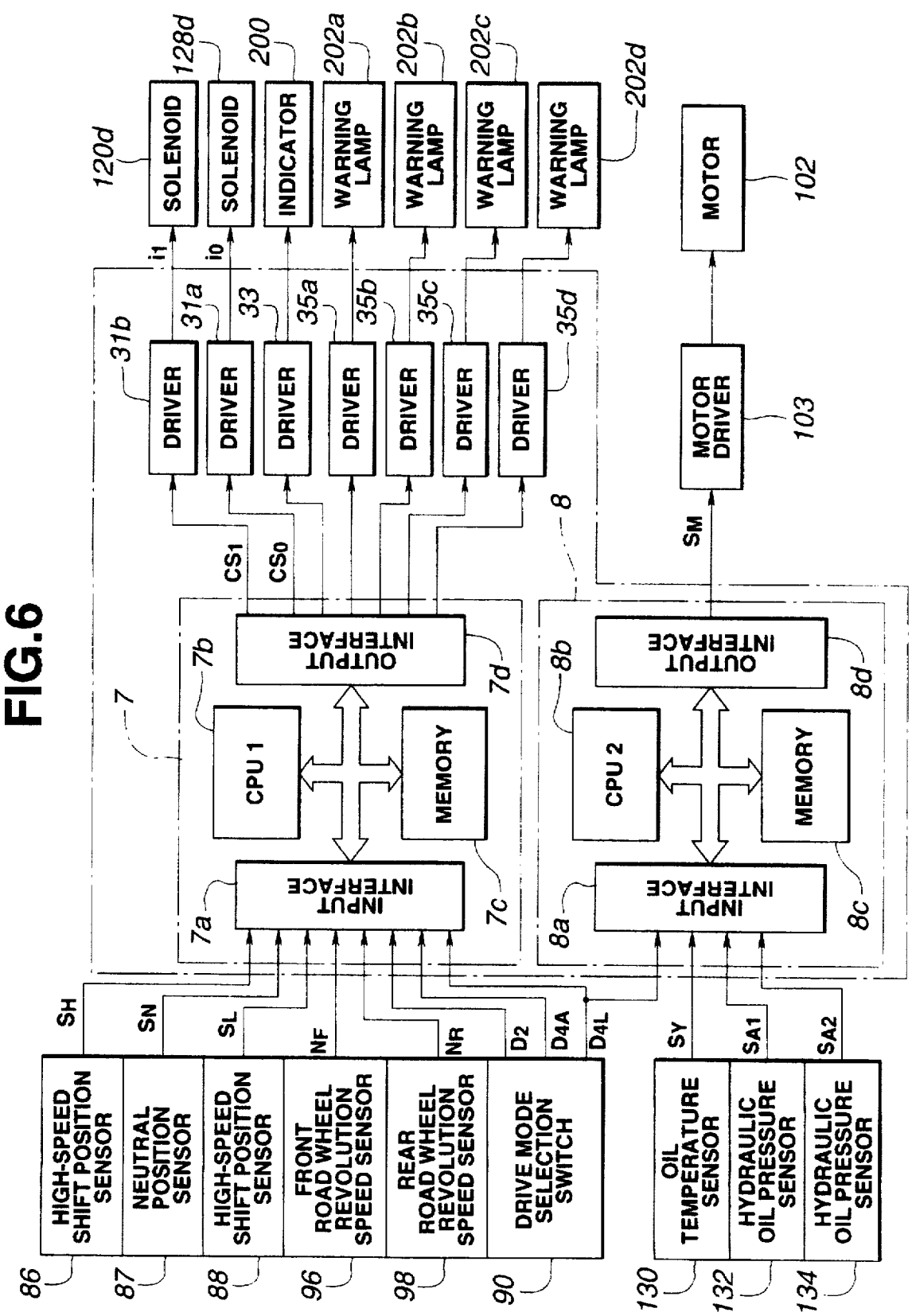
FIG. 6 is a circuit block diagram of a controller and its peripheral circuit in the driving force transfer apparatus in the preferred embodiment shown in FIG. 1.

The controller 18, as shown in FIG. 6, includes: a) a microcomputer 7 to perform mainly the driving force distribution control; b) a microcomputer 8 to perform mainly the above-described predetermined hydraulic (line) pressure maintenance control; c) a driver 31a which supplies the exciting current $i_0$ having the required duty ratio related thereto to the solenoid 128d of the duty ratio control electromagnetic valve 128 in the hydraulic (oil) pressure supply 16 according to the control signal $CS_0$ from the microcomputer 7; a driver 31b which supplies the exciting current $i_1$ to the solenoid 120d of the electromagnetic switching valve 120 in the hydraulic oil pressure supply 18 in response to the control signal $CS_1$ from the microcomputer 7, the exciting current $i_1$ being turned on and off depending on the content of the control signal $CS_1$ from the microcomputer 7; and a motor driver 103 which performs a chopper control for the sub motor 102 according to the motor control signal $S_M$ from the microcomputer 8 and performs a speed control of the sub motor 102 whose revolution speed is in accordance with the motor control signal $S_M$.

The controller 18, in the embodiment, further includes: an indicator driver 33 which controls a turn on or off of the indicator 200 according to the content of the range shift position indicative signal $S_D$ from the microcomputer 7; a plurality of lamp drivers 35a through 35d which drive to turn on the abnormality indicating (warning) lamps 202a through 202d on the basis of the contents of the warning signals $A_{SH}$, $A_{SL}$, $A_{NF}$, and $A_{NR}$ from the microcomputer 7.

The microcomputer 7 includes: an input interface 7a having an analog-to-digital conversion function to read the detection signals from each sensor 86, 87, 88, 90, 96, and 98 as respectively detected values; an arithmetic processing unit (so-called, CPU 1 (first Central Processing Unit)) 7b to perform the arithmetic, logic, and control processing (refer to FIG. 10) so as to perform the driving force distribution control in accordance with a predetermined program; a memory 7c having a ROM (Read Only Memory) and a RAM (Random Access Memory); and an output interface 7d which outputs the control signal $CS_0$ having the duty ratio D instructing the clutch pressure Pc determining the front road wheel torque distribution ratio to the front road wheels derived by the CPU 1 and outputs the control signal $CS_1$ determining whether the clutch pressure Pc should be output. In addition, the output interface 7d outputs the shift position indicative signal $S_D$ to the indicator 200 and outputs the abnormality detection signals (warning signals) $A_{SH}$, $A_{SL}$, $A_{NF}$, and $A_{NR}$ to the warning lamps 202a through 202d.

In addition, the microcomputer 8 includes: an input interface 8a having an analog-to-digital conversion function to read the detection signals from the respective sensors 130, 132, and 134 as respective detection values; an arithmetic, logic processing unit (so-called, CPU 2) 8b; a memory 8c such as the ROM and RAM; and an output interface 8d having a digital-to-analog conversion function to output a sub motor revolution speed instruction value derived from the CPU 2 8b in the form of, for example, an analog voltage signal $S_M$.

Figure 10:
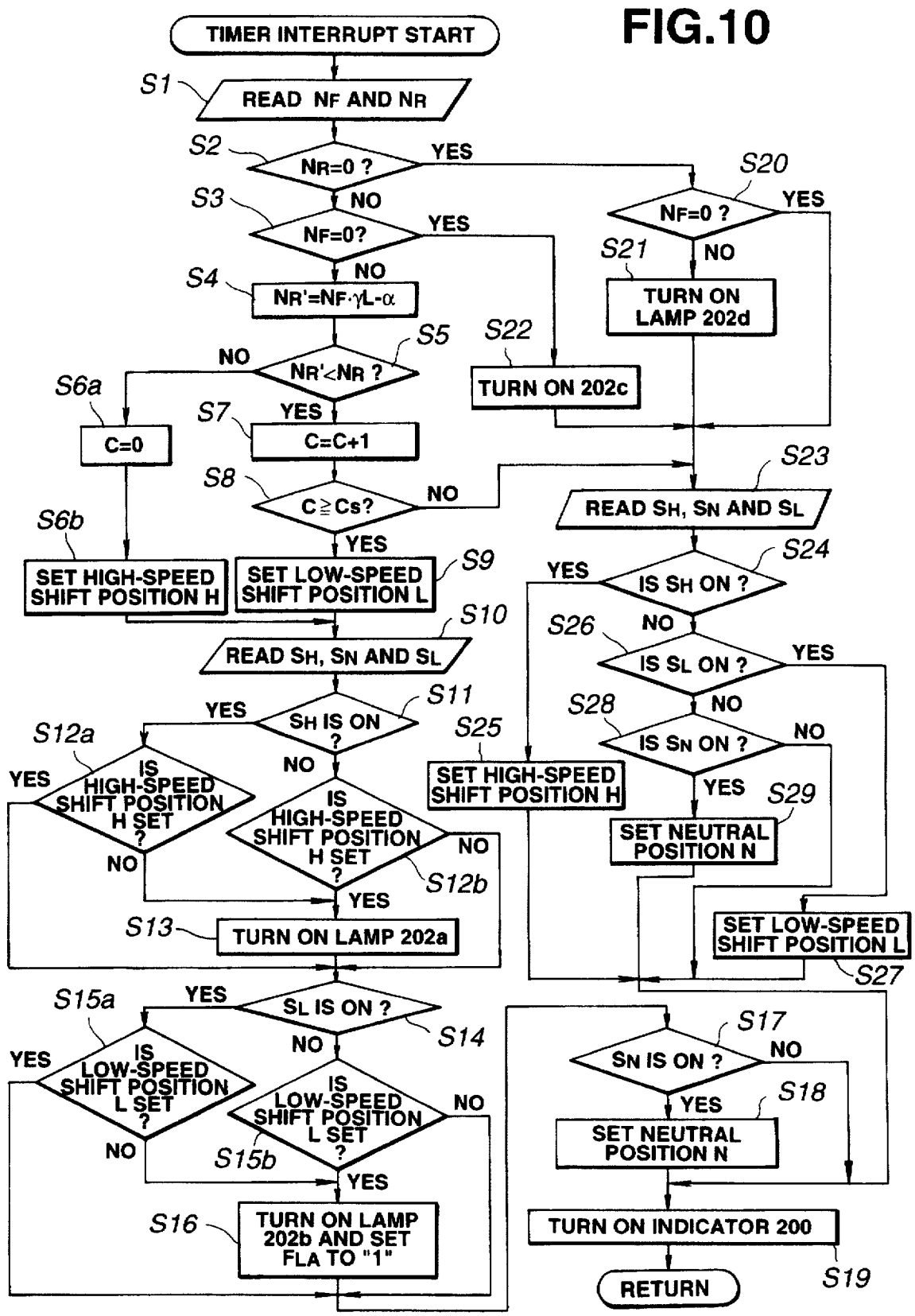
FIG. 10 is an operational flowchart for explaining a shift sleeve position diagnosing interrupt routine executed in the controller shown in FIGS. 1 and 6.

The microcomputer 7, in accordance with the calculation (arithmetic) processing of FIG. 10, controls the control signal $CS_0$ so as to be turned off with the control signal $CS_1$ turned on: a) when the two-wheel drive state is represented by the on state of the selection signal $D_2$ of the mode selection switch 90 and the neutral position detection signal $S_N$ is in the off state; b) when the low-speed gear range shift position signal $S_L$ is in the on state; and c) when the neutral position signal $S_N$ is in the on state and the revolution speed signals $N_F$ and $N_R$ are both zeroed, sets a front road wheel side torque (driving force) distribution ratio instruction value $T_2$, calculates the duty ratio D instructing the clutch pressure Pc corresponding to the instruction value $T_2$, and outputs the control signal $CS_0$ of the instruction value corresponding to the duty ratio D with the control signal $CS_1$ turned off when the selection signal of $D_{4A}$ or $D_{4L}$ is in the on state to represent that the vehicle is in the four-wheel drive state and the neutral position signal $S_N$ is in the off state. The microcomputer 7 outputs these control signals $CS_0$ and $CS_1$ to the drivers 31a and 31b, outputs the shift position indicative signal $S_D$ of the shift position of the high-speed and low-speed gear range position switching mechanism 64 to the indicator driver 33, diagnoses the gear range shift position sensors 86, 88, and revolution speed sensors 96 and 98, and outputs the warning signals $A_{SH}$, $A_{SL}$, $A_{NF}$, and $A_{NR}$ to the lamp drivers 35a through 35d, respectively, after the diagnosis operation.

The driver 31a includes, for example, a pulse width modulation circuit which outputs the exciting current having the (pulse) duty ratio D corresponding to the instruction value of the control signal $CS_0$ which is an analog voltage value output from the microcomputer 7 to the solenoid 128d of the duty ratio control electromagnetic valve 128.

In addition, the driver 31b converts the control signal $CS_1$ output from the microcomputer 7 into the exciting current $i_1$ having a current value excitable for the solenoid 120d of the electromagnetic on-off switching valve 120, the converted exciting current $i_1$ being output to the solenoid 120d of the electromagnetic switching valve 120.

The indicator driver 33 selectively displays through the indicator 200 any one of the high-speed gear range (shift) position H, neutral position N, and low-speed gear range shift position L on the basis of the content of the shift position indicative signal $S_D$.

The lamp drivers 35a through 35d turn on respectively corresponding warning lamps 202a through 202d when the warning signals of $A_{SH}$, $A_{SL}$, $A_{NF}$ and $A_{NR}$ are in the on states.

The arithmetic operation processing carried out in the controller 18 in the embodiment, namely, the control to enable the hydraulic (oil) pressure supply 16 at the required hydraulic oil pressure will be described below. For example, when the arithmetic calculation processing is carried out and when the hydraulic oil pressure switch 132 detects that the line pressure $P_L$ located at the downstream of the oil element 112 in the converging pipe 110a has reduced to a set value or below the set value, the CPU 2 calculates the control signal $S_M$ representing the revolution speed instruction value set according to the oil temperature detection value $S_V$ from the oil temperature sensor 120, the control signal $S_M$ being supplied to the motor driver 103, thus the revolution speed of the sub motor 102 being controlled. Consequently, the line pressure $P_L$ output from the hydraulic (oil) pressure supply 16 is maintained at a predetermined pressure.

It is noted that when the hydraulic oil pressure switch 132 detects that the line pressure $P_L$ is below the set pressure and this pressure state is continued for equal to or more than a predetermined period of time, a failure in the hydraulic source is determined and the warning is issued. When the hydraulic (oil) switch 134 detects that the clutch pressure Pc output from the pilot switching valve 126 is below the set pressure with the hydraulic (oil) pressure switch 132 detects that the line pressure $P_L$ is in the normal pressure value and with the mode selection switch 90 selected at the four-wheel drive lock mode, the warning signal is issued since the microcomputer 8 determines that any one of the electromagnetic switching valve 120, the clutch pressure regulating valve 122, the pressure reducing valve 124, and the duty ratio control electromagnetic valve 128 has failed.

The memory 7c of the microcomputer 7 previously stores a program required to execute the arithmetic processing of the CPU 1 and fixed data. The result of processing is temporarily stored therein.

Figure 7:
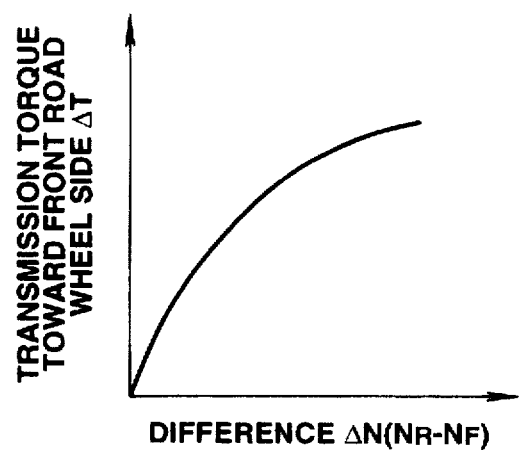
FIG. 7 is a control characteristic graph representing a relationship between a transmission torque to be transmitted to front road wheels (secondarily driven road wheels) and a difference in revolution speed between first and second output axles in the transfer shown in FIGS. 2 and 3.
Figure 8:
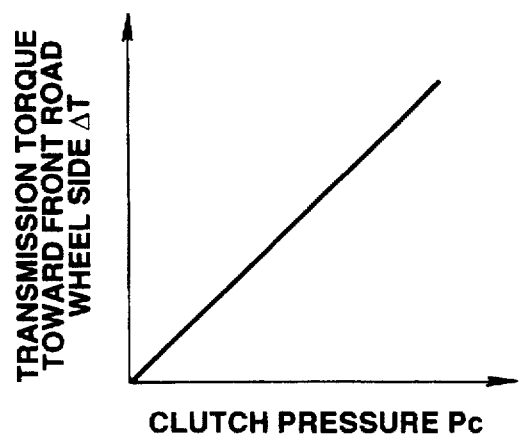
FIG. 8 is a control characteristic graph representing a relationship between the transmission torque to be transmitted to the front road wheels and a variation in a clutch pressure Pc to be supplied to the transfer, namely, a frictional clutch.
Figure 9:
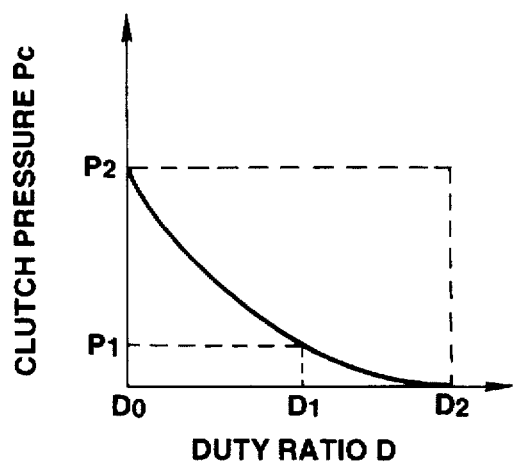
FIG. 9 is a control characteristic graph representing a relationship between a duty ratio D for an exciting current to be supplied to the hydraulic (oil) pressure supply shown in FIG. 4 and the clutch pressure Pc.

The fixed data in the memory 7c include memory tables corresponding to the respective control characteristics shown in FIGS. 7 through 9.

FIG. 7 shows the control characteristic of the transmission torque $\Delta T$ with respect to the front-and-rear road wheel side revolution speed difference $\Delta N$ (a difference in the revolution speeds between the front road wheels and the rear road wheels). It is noted that the difference $\Delta N$ in the revolution speeds between the front road wheels and rear road wheels is derived using front road wheel revolution speed sensor 96 and rear road wheel speed sensor 98. As viewed from FIG. 7, the front road wheel side driving force distribution $\Delta T$ is increased nonlinearly according to the increase in the difference $\Delta N$ of the revolution speeds. In addition, FIG. 8 shows the value of the transmission torque $\Delta T$ to the front wheel side which linearly increases according to the variation in the clutch pressure Pc of the pilot switching valve 126.

FIG. 9 shows values of the clutch pressure Pc of the clutch pressure regulating valve 122 which are nonlinearly decreased according to the increase in the duty ratio D of the exciting current $i_o$ supplied to the solenoid 128d of the duty ratio control electromagnetic valve 128.

When the memory table corresponding to FIG. 7 is referred to by the microcomputer 7 on the basis of the difference $\Delta N$ between the front and rear road wheel revolution speeds to determine the transmission torque $\Delta T$, the value of the duty ratio D to be output from the controller 18 is calculated in a back calculation method.

When the clutch pressure $P_1$ through $P_2$ which is decreased with the increase in the duty ratio value ranging from $D_0$ to $D_1$ shown in FIG. 9 is supplied to the frictional clutch 66, a predetermined torque distribution ratio which accords with the clutching force of the frictional clutch 66 is continuously varied from rear road wheel distribution percentage: front road wheel distribution percentage=50%:50% to rear road wheel distribution percentage: front road wheel distribution percentage=100% :0%.

The clutch pressure Pc shown in FIG. 9 indicates the lowered pressure when the duty ratio D is equal to or greater than $D_2$ such that the torque (driving force) distribution from the first output axle 44 to the second output axle 54 is not carried out and the frictional clutch 66 is in a slight junction (clutched) state (a state in which the friction plates 66b of the frictional clutch and the friction discs 66d thereof are slightly pressurized and slipped to one another).

Figure 11:
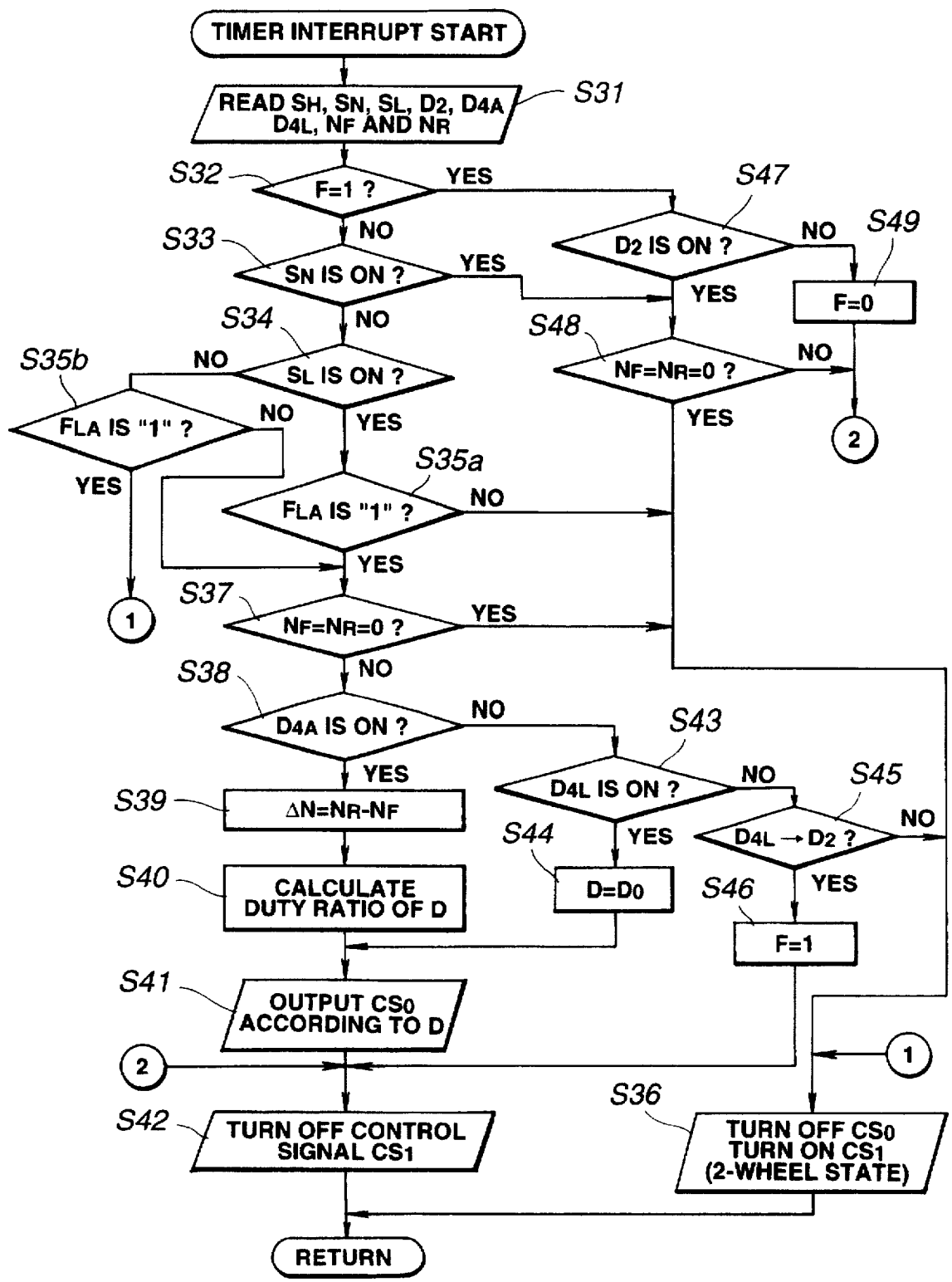
FIG. 11 is an operational flowchart for explaining a clutch pressure control interrupt routine executed in the controller shown in FIGS. 1 and 6.

Then, the microcomputer 7 executes a gear range shift position sensor diagnosis routine shown in FIG. 10 and a clutch pressure control routine shown in FIG. 11.

It is noted that the program shown in FIG. 10 is executed as a timer interrupt routine for each predetermined time $\Delta T$ (for example, $\Delta T$=20 milliseconds)

At a step S1, the CPU 1 (7b) reads the revolution speed values $N_F$ and $N_R$ of the front road wheel side revolution sensor 96 and of the rear road wheel side revolution sensor 98.

At a step S2, the CPU 1 determines whether the rear road wheel side revolution speed value $N_R$ is zero.

If $N_R \neq 0$ (No) at the step S2, the interrupt routine goes to a step S3 temporarily determining that the vehicle is in the running state.

At the step S3, the CPU 1 determines whether the front road wheel side revolution speed value $N_F$ is zero. If $N_F \neq 0$ (No) at the step S3, the routine goes to a step S4 regularly determining that the vehicle is really in the running state.

At the step S4, the CPU 1 calculates an estimated value $N_R'$ of the rear road wheel side revolution speed at the 4L range in the sub transmission 58 using the following equation on the basis of the front road wheel revolution speed value $N_F$.

$$N_R' = N_F \gamma_L - \alpha \qquad (1),$$

wherein $\gamma_L$ denotes a gear ratio in the 4L range of the sub transmission 58 and $\alpha$ denotes a constant with a measurement error in the front road wheel side revolution speed value taken into consideration.

Next, the routine goes to a step S5.

At the step S5, the CPU 1 determines whether the calculated rear road wheel side revolution estimated value $N_R'$ is below the rear road wheel revolution speed detected value $N_R$ read at the step S2.

If $N_R' \geq N_R$ (No) at the step S5, the CPU 1 determines that the shift sleeve 64b has placed at the high-speed gear range (shift) position H and the routine goes to a step S6a. At the step S6a, a counter value of C to determine whether the rear road wheels 12RL and 12RL are in an acceleration slip state as will be described later is cleared to zero and the routine goes to a step S6b.

At the step S6b, the CPU 1 sets the high-speed gear range position determination H in a shift position memory region formed in the memory 7c and thereafter the routine goes to a step S10. If $N_R' < N_R$ at the step S5, the CPU 1 temporarily determines that the shift sleeve 64b has slided at the low-speed gear range shift position L and the routine goes to a step S7. At the step S7, the count value C of the counter is incremented by one and the routine goes to a step S8. At the step S8, the CPU 1 determines whether the count value C is equal to or greater than a set value of Cs (Cs corresponds to a set time period to determine whether the rear road wheels have slipped during the acceleration), for example, approximately 20 seconds. If $C \geq C_s$ (Yes) at the step S8, the CPU 1 determines that the result of comparison at the step S5 is not due to the acceleration slip of the rear road wheels and that the shift sleeve 64b has moved to the low-speed gear range position L without erroneous determination and the routine goes to a step S9. At the step S9, the CPU 1 sets the low-speed gear range shift position L into the shift position memory region of the memory 7c and the routine goes to a step S10.

At the step S10, the CPU 1 reads the detection signals $S_H$, $S_N$, and $S_L$ of the respective gear range shift position sensors 86, 87, and 88.

At the next step S11, the CPU 1 determines whether the detection signal $S_H$ of high-speed gear range (shift) position sensor 86 is in the on state. If $S_H$ is in the on state at the step S11, the routine goes to a step S12a in which the CPU 1 determines whether the high-speed gear range position determination H is stored in the shift position memory area of the memory 7c. This determination at the step S12a means the determination whether the high-speed gear range position sensor 86 is normal (does not fail). If Yes at the step S12a, the CPU 1 determines that the high-speed gear range position sensor 86 is normal and the routine goes to a step S14. If No at the step S12a, namely, the high-speed gear range position determination H is not set in the memory 7c, the CPU 1 determines that the high-speed gear range (shift) position sensor 86 is abnormal (has failed) and the routine goes to a step S13.

At the step S13, the CPU 1 commands to turn on the warning lamp 202a so as to indicate that the high-speed gear range position sensor 86 is abnormal (has failed) and a flag $F_{HA}$ indicating that the high-speed gear range position sensor 86 has failed when set to "1" is set to "1" (this flag $F_{HA}$ is not shown in FIG. 10 but will be explained later).

Then, the CPU 1 determines that the high-speed gear range shift position detection signal $S_H$ is in the off state (No) at the step S11, the routine goes to a step S12b. In the same way as the step S12a, the CPU 1 determines whether the high-speed gear range shift position H is set in the shift position memory region in the memory 7c at the step S12b. This determination also means the determination of whether the high-speed gear range position sensor 86 is normal (not failed). If Yes at the step S12b even through $S_H$ is in the on state at the step S11, the CPU 1 determines that the high-speed gear range shift position sensor 86 has failed and the routine goes to the step S13. If the low-speed gear range shift position determination L is set in the shift range memory region of the memory 7c (No at the step S12b), the CPU 1 determines that the high-speed gear range position sensor 86 is normal and the routine goes to a step S14.

At the step S14, the CPU 1 determines whether the low-speed gear range shift position sensor signal $S_L$ is in the on state. If $S_L$ is in the on state (Yes) at the step S14, the routine goes to a step S15a in which the CPU 1 determines whether the low-speed gear range shift position L is set in the shift position memory region of the memory 7c. This determination means the determination of whether the low-speed gear range position sensor 88 is normal.

If the low-speed gear range position determination L is set in the shift position memory region of the memory 7c at the step S15a (Yes), the CPU 1 determines that the low-speed gear range position sensor 88 is normal and the routine goes to a step S17.

If No at the step S15a, the CPU 1 determines that the low-speed gear range shift position sensor 88 is abnormal and the routine goes to a step S16.

At the step S16, the CPU 1 sets a flag $F_{LA}$ indicating that the low-speed gear range position sensor 88 has failed to "1" and commands to turn on the corresponding warning lamp 202b. Then, the routine goes to the step S17.

On the other hand, if $S_L$ is in the off state at the step S14 (No), the routine goes to the step S15b.

At the step S15b, the CPU 1 determines whether the low-speed gear range position determination L is set in the shift position memory region of the memory 7c in the same way as the step S15a. This determination also means the determination of whether the low-speed gear range position sensor 88 is normal.

If the CPU 1 determines that the low-speed gear range position determination L is set in the shift position memory region (Yes) at the step S15b, the CPU 1 determines that the low-speed gear range position sensor 88 has failed and the routine goes to the step S16 whose content is already described.

At the step S17, the CPU 1 determines whether the neutral position detection signal $S_N$ is in the on state. If the neutral position detection signal $S_N$ is in the on state at the step S17 (Yes), the routine goes to a step S18 in which the neutral position determination N is set in the shift position memory region of the memory 7c. Thereafter, the routine goes to a step S19. If $S_N$ is in the off state (No) at the step S17, the routine directly goes to the step S19.

At the step S19, the CPU 1 commands to turn on the corresponding indicator 200 on the basis of the gear range shift position set in the shift position memory region of the memory 7c to inform the driver of the present gear range shift position and the routine at this time is ended to return to a main program (not shown).

On the other hand, referring back to the step S2, if the rear road wheel side revolution speed detection value $N_R$ indicates zero (Yes), the routine goes to a step S20.

At the step S20, the CPU 1 determines whether the front road wheel side revolution speed value $N_F$ is zero in the same way as the step S3.

If $N_F \neq 0$ (No) at the step S20, the CPU 1 determines that the vehicle is running and the rear road wheel-side revolution speed sensor 98 has failed and the routine goes to a step S21. At the step S21, the CPU 1 commands to turn the warning lamp 202s to inform the driver of the failure in the rear road wheel revolution speed sensor 98 and the routine goes to a step S23.

At the step S23, the CPU 1 reads the gear range position detection signals $S_H$, $S_L$, $S_N$ of the respective gear range position sensors 86, 88, and 87.

Then, the routine goes to a step S24.

At the step S24, the CPU 1 determines whether $S_H$ is in the on state in the same way as the step S11.

If Yes ($S_H$ is in the on state) at the step S24, the routine goes to a step S25. At the step S25, the CPU 1 sets the high-speed gear range position determination H in the shift position memory region in the memory 7c. Then, the routine goes to the step S19 described above. If $S_H$ is in the off state (No) at the step S24, the routine goes to a step S26.

At the step S26, the CPU 1 determines whether $S_L$ is in the on state in the same way as the step S14.

If $S_L$ is in the on state (Yes) at the step S26, the routine goes to a step S27 in which the low-speed gear range position determination L is set in the shift position memory region of the memory 7c and the routine goes to the step S19. If $S_L$ is in the off state (No) at the step S26, the routine goes to a step S28.

At the step S28, the CPU 1 determines whether the neutral position detection signal $S_N$ is in the on state. If $S_N$ is in the on state (Yes) at the step S28, the routine goes to a step S29 in which the CPU 1 sets the neutral position determination N in the shift position memory region in the memory 7c. Thereafter, the routine goes to the step S19. If $S_N$ is in the off state at the step S28 (No), the routine goes directly to the step S19.

On the other hand, if the CPU 1 determines that $N_F$ is zero at the step S3, the CPU 1 determines that the vehicle is running and the front road wheel side revolution speed detection value $N_F$ is abnormal and the routine goes to a step S22 in which the CPU 1 commands to turn on the warning lamp 202c to inform the driver of the failure in the front road wheel side revolution speed sensor 96. Then, the routine goes to the step S23.

Furthermore, if C<Cs at the step S8, the routine goes to the step S23 since the CPU 1 determines that there is a possibility in the acceleration slip on the rear road wheels 12RL and 12RR.

Next, FIG. 11 shows the clutch pressure control routine executed as a timer interrupt routine in the same way as shown in FIG. 10.

At a step S31, the CPU 1 reads the high-speed gear range position detection signal $S_H$, the low-speed gear range position detection signal $S_L$, the neutral position detection signal $S_N$, the selection signals $D_2$, $D_{4A}$, and $D_{4L}$ of the mode selection switch 90, the front road wheel side revolution speed value $N_F$, and rear road wheel side revolution speed value $N_R$, respectively.

At the next step S32, the CPU 1 determines whether a flag F which indicates when set to "1" that the drive mode is switched from the four-wheel drive lock mode to the two-wheel drive mode. If the flag F is reset to "0" at the step S32, the routine goes to a step S33.

At the step S33, the CPU 1 determines whether the neutral position signal $S_N$ is in the on state.

If $S_N$ is in the off state (No) at the step S33, the routine goes to a step S34 in which the CPU 1 determines whether the low-speed gear range position detection signal $S_L$ is in the on state.

If $S_L$ is in the on state at the step S34 (Yes), the routine goes to a step S35a in which the CPU 1 determines whether the flag $F_{LA}$ described with reference to FIG. 10 is set to "1".

If the flag FLA is set to "0" at the step S35a (No), the CPU 1 determines that the low-speed gear range position sensor 88 is normal and the routine goes to a step S36.

If the flag FLA is set to "1", the CPU 1 determines that the low-speed gear range position sensor 88 has failed and the routine goes to a step S37.

If $S_L$ is in the off state at the step S34 (No), the routine goes to a step S35b. At the step S35b, in the same way as the step S35a, the CPU 1 determines whether the flag $F_{LA}$ is set to "1".

If the flag FLA is reset to "0" at the step S35b, the routine goes to a step S37.

If the flag $F_{LA}$ is set to "1" at the step S35b, the routine jumps to the step S36.

At the step S36, the CPU 1 commands to set the control signal $CS_1$ for the electromagnetic switching valve 120 to the on state and to set the control signal $CS_O$ for the duty ratio control electromagnetic valve 128 to the off state so that the vehicle is in the two-wheel drive state. Thereafter the present routine is ended.

At the step S37, the CPU 1 determines whether the vehicle is stopped (parked). This determination is based on the determination of whether both of the front and rear road wheel side revolution speeds $N_F$ and $N_R$ are zeroes. If $N_F=N_R=0$ (Yes) at the step S37, the CPU 1 has determined that the vehicle is parked (stopped), the routine goes to the step S36.

If $N_F$ and $N_R$ are not zeroed (No) at the step S37, namely, the vehicle is running, the routine goes to a step S38.

At the step S38, the CPU 1 determines whether the mode signal $D_{4A}$ representing the four-wheel drive automatic mode is in the on state.

If Yes at the step S38, the routine goes to a step S39 in which the revolution speed difference is calculated as $\Delta N = N_R - N_F$. Then, the routine goes to a step S40.

At the step S40, the CPU 1 refers sequentially to FIGS. 7, 8, and 9 to calculate the front road wheel side torque distribution $\Delta T$ with respect to the revolution speed difference $\Delta N$, to calculate the clutch pressure Pc for the frictional clutch 66 based on the calculated front torque distribution $\Delta T$, and to calculate the duty ratio D ranging from $D_0$ to $D_1$ so that the calculated duty ratio D is updated into a duty ratio memory region of the memory 7c.

At the next step S41, the CPU 1 outputs the control signal $CS_O$ of an instruction value corresponding to the duty ratio D stored in the duty ratio memory region to the driver 31a and the routine goes to a step S42.

At the step S42, the CPU 1 turns off the control signal $CS_1$ for the electromagnetic switching valve 120 to be output to the driver 31b and the present routine is ended.

On the other hand, if the mode signal $D_{4A}$ is in the off state (No) at the step S38, the routine goes to a step S43.

At the step S43, the CPU 1 determines whether the mode signal $D_{4L}$ is in the on state.

If the mode signal $D_{4L}$ is in the on state (Yes) at the step S43, the CPU 1 determines that the mode selection switch 90 is in the four-wheel drive lock mode and the routine goes to a step S44.

At the step S44, the CPU 1 updates the duty ratio $D_0$ representing that an on duty of the duty ratio D is zero, namely, the duty ratio is in the off state into the duty ratio memory region and the routine goes to a step S41.

On the other hand, if the mode signal $D_{4L}$ is in the off state at the step S43 (No), the CPU 1 determines whether it is an immediately after the switching from the four-wheel drive lock mode to the two-wheel drive mode has carried out.

If Yes at the step S45, the routine goes to a step S46 in which the switching flag F is set to "1". Thereafter, the routine goes to the step S42. If No at the step S45, the routine goes to the step S36 directly.

Referring back to the step S32, if the switching flag F is set to "1", the routine goes to a step S47. At the step S47, the CPU 1 determines whether the mode signal $D_2$ is in the on state.

If the CPU 1 determines that the mode signal $D_2$ is in the on state (Yes) at the step S47, the present routine goes to a step S48 determining that the switched state in the two-wheel drive mode is continued. At the step S48, the CPU 1 determines whether the vehicle is parked (stopped)(the engine 10 is in the idling state) in the same way as the step S37.

If $N_R=N_R=0$ at the step S48 (Yes), the routine goes to the step S36.

If the vehicle is running at the step S48 (No), the routine goes to the step S42.

On the other hand, if the mode signal $D_2$ is in the off state at the step S47 (No), the CPU 1 determines that the vehicle is returned to the four-wheel drive mode and the routine goes to a step S49.

At the step S49, the switching flag F is reset to "0" and the routine goes to the step S42.

Furthermore, if the neutral position signal $S_N$ is in the on state at the step S33 (Yes), the routine goes to the step S48.

Next, an operation of the driving force transfer apparatus in the embodiment described above will be explained below.

Suppose now that the vehicle is stopped, a selection lever of the automatic power transmission 20 (in the embodiment, the torque converter equipped automatic power transmission is used) is positioned at the parking range, the lever of the sub transmission is placed at the 4H range, the mode selection switch 90 is operated to select the two-wheel drive mode, and the engine 10 is stopped.

In this state, when an ignition switch of the vehicle is turned on to start the engine 10, the controller receives a power supply so that each microcomputer 7 and 8 starts the given arithmetic operation.

At this time, the vehicle is stopped, the selection lever of the automatic power transmission is in the parking range, and the driving force from the engine 10 is not transmitted to the output axle of the automatic power transmission. The linked input axle 42 and the first output axle 44 in the transfer 22 are not revolved. Thus, the main pump 100 of the hydraulic (oil) supply 16 is stopped and the line pressure $P_L$ of the converging pipe 110a indicates approximately zero. Thus, the hydraulic oil switch 132 is in the on state so that its switch signal $S_1$ is supplied to the microcomputer 8. Then, the microcomputer 8 determines the revolution speed of the motor 102 on the basis of the oil temperature value $S_V$ from the oil temperature sensor 130 and outputs the motor drive control signal $S_M$ to the driver 103 according to the determined revolution speed. Therefore, the motor 102 is revolved according to the determined revolution speed. Then, the sub pump 104 is driven so that a predetermined pressurized working oil is drained from the sub pump 104 to be supplied to the converging pipe 110a via the check valve 108d so that the line pressure $P_L$ is boosted. The, when the line pressure $P_L$ reaches to a set pressure, the hydraulic oil switch 132 is in the off state and the revolution of the motor 102 is accordingly stopped.

On the other hand, the microcomputer 7 executes the sensor diagnosing routine shown in FIG. 10. However, since the vehicle is stopped and both of the front road wheel side revolution speed value $N_F$ and the rear road wheel side revolution speed value $N_R$ are zeroed, the microcomputer 7 cannot determine the gear range shift position of the high-speed and low-speed gear range position switching mechanism 64 based on the detection values described above. Therefore, the routine shown in FIG. 10 is transferred from the steps S1 and S2 via the step S20 to the step S23 to read the detection signals $S_H$, $S_N$, and $S_L$. As described above, since the sub transmission lever is placed at the 4H range, the shift sleeve 64b is placed at the high-speed gear range shift position H and $S_H$ is in the on state. Thus, the routine shown in FIG. 10 is transferred to the step S25. At the step S25, the high-speed gear range shift position determination H is updated in the shift position memory region of the memory 7c. Then, at the step S19, the indicator 200 turns on the indicator lamp representing the high-speed gear range position.

At this time, since the position sensor diagnosing routine of the steps S3 through S18 are not executed, the flags $F_{HA}$ (indicating that the high-speed gear range shift position sensor 86 has failed when set to "1" and $F_{LA}$ are reset to "0's").

In this state, if the clutch pressure control processing is executed as shown in FIG. 11, since the initial state, the switching flag F is reset to "0". Therefore, the routine shown in FIG. 11 is transferred from the steps S31, S32, and S33 to the step S34. Since the $S_L$ is in the off state, the routine goes to the step S37. Since the vehicle is stopped, the routine goes to the step S36 so that the control signal $CS_0$ is in the off state for the duty ratio control electromagnetic valve 128 is in the off state and the control signal $CS_1$ for the solenoid 120d of the electromagnetic switching valve 120 is turned off.

Therefore, the duty ratio control electromagnetic valve 128 maintains at the normal position 128B shown in FIG. 4 and the pilot control pressure output from the duty ratio control electromagnetic valve 128 is in the relatively high state so that the clutch pressure Pc output from the clutch pressure regulating valve 122 gives its maximum pressure near to the line pressure $P_L$.

However, since the electromagnetic switching valve 120 is supplied with the exciting current $i_1$ having a predetermined value, the valve 120 is switched from the normal position 120b to the operation position 120c shown in FIG. 4 so that the line pressure $P_L$ is supplied to the pilot switching valve 126 as the pilot pressure. Consequently, the pilot switching valve 126 is switched from the normal position shown in FIG. 4 to the operation position 126c, its input port $120_A$ is blocked and the output port $120_B$ is communicated with the drain port $120_D$. The pilot control pressure for the pilot switching valve 126 gives approximately the atmospheric pressure.

Hence, since the pilot switching valve 126 is also switched from the normal position 126b shown in FIG. 4 to the operation position 126c, its input port $126_A$ is blocked and the output port $126_B$ is communicated with the drain port $126_D$. The clutch pressure Pc supplied to the frictional clutch 66 gives the atmospheric pressure. Hence, the frictional clutch 66 is maintained at the nonengaged state (no clutched state) so that the driving force transmission route between the first output axle 44 and the first sprocket 68 is interrupted and the vehicle is maintained at the two-wheel drive state (only the rear road wheels are driven road wheels).

Thereafter, for example, suppose that the vehicle runs on a paved road (no rugged road).

In this case, with the sub transmission lever maintained at the 4H range, a vehicular brake system is released after the selection lever of the automatic power transmission into the D range and, thereafter, a vehicular accelerator (pedal) is effectively depressed so that the vehicle can run. Then, when the vehicle runs in the two-wheel drive mode, the revolution speed detection values of $N_F$ and $N_R$ of the front road wheel side revolution speed sensor 96 and of the rear road wheel side revolution speed sensor 98 are increased as the vehicle speed is increased. At this time, suppose that no slip on the rear road wheels (mainly driven road wheels) occurs. In this supposition, both of the front road wheel side revolution speed $N_F$ and the rear road wheel side revolution speed $N_R$ are mutually approximately equal. When the shift position sensor diagnosing routine shown in FIG. 10 is executed, the estimated value $N_R$ of the rear road wheel side revolution speed calculated on the basis of the front road wheel side revolution speed $N_F$ (refer to the equation (1)) in the four-wheel drive lock mode at the step S4 gives a larger value than the actual rear road wheel revolution speed value $N_R$. Therefore, the routine shown in FIG. 10 transfers from the step S5 to the step S6a so that the count value C is cleared to zero. Then, at the step S6b, the high-speed gear range shift position determination H is set in the shift position memory region and the routine goes from the step S10 to the step S11. Since the high-speed gear range shift position detection signal $S_H$ is in the on state, the microcomputer 7 determines that the high-speed gear range position sensor 88 is normal (not failed). Since the other gear range shift position detection signals $S_L$ and $S_N$ are in the off state, the high-speed gear range position display is continued on the indicator 200.

In this way, when the vehicle starts to run, the first output axle 44 is driven so that the main pump 100 mechanically linked to the first output axle 44 is driven to revolve. Thus, the working oil is drained from the main pump 100 so that the drained working oil is supplied to the converging pipe 110a via the check valve 106d as the line pressure. Consequently, when the line pressure $P_L$ is maintained at the set pressure according to the drain pressure by means of the main pump 100, the hydraulic pressure oil switch 132 is in the off state so that the drive of the motor 102 through the microcomputer 8 is stopped.

In addition, in the clutch pressure control routine shown in FIG. 11, since the vehicle has started, the routine shown in FIG. 11 is transferred from the step S37 to the step S38. Then, since the mode signal $D_2$ of the mode selection switch 90 is in the on state, the routine shown in FIG. 11 is transferred from the steps S43 and S45 to the step S36. Therefore, the vehicle runs with the two-wheel drive mode continued.

On the other hand, suppose that the vehicle in which the transfer apparatus in the embodiment is mounted runs on a low frictional coefficient road such as a snowy road or frozen road.

In this case, with the sub transmission lever maintained at the 4H range, the mode selection switch 90 is operated, for example, to select the four-wheel drive automatic mode.

According to the selection of the four-wheel drive automatic mode through the mode selection switch 90, the routine shown in FIG. 10 is transferred from the step S38 to the step S39. At this step, $\Delta N = N_R - N_F$ is calculated. At the step S40, the duty ratio D of the control signal $CS_0$ for the duty ratio control electromagnetic valve 128 is determined. At the next step S42, the control signal $CS_1$ for the electromagnetic switching valve 120 is in the off state. Therefore, since the exciting current $i_1$ for the electromagnetic switching valve 120 output from the driver 31b is in the off state, the electromagnetic switching valve 120 is returned to the normal position 120b. Consequently, the pilot pressure on the line pressure $P_L$ supplied to the pilot switching valve 126 is eliminated. Hence, the pilot switching valve 126 is also returned to the normal position 126b. The clutch pressure Pc output from the clutch pressure regulating valve 122 is supplied to the frictional clutch 66.

On the other hand, since the exciting current $i_0$ having the duty ratio D is supplied from the driver 31a to the duty ratio control electromagnetic valve 123, the pilot control pressure which is inversely proportional to the duty ratio D is output from the duty ratio control electromagnetic valve 128 to the clutch pressure regulating valve 122. Then, the clutch pressure Pc which accords with the pilot control pressure is output from the clutch pressure regulating valve 122.

Hence, in a state where the difference $\Delta N$ in revolution speed between the front road wheel side and rear road wheel side revolution speeds is small, the duty ratio D becomes near to 100% so that the on time duration of the exciting current $i_0$ output from the driver 31a becomes longer than the off time duration. Accordingly, the pilot control pressure output from the duty ratio control electromagnetic valve 128 becomes approximately zero and the clutch pressure Pc output from the clutch pressure regulating valve 122 becomes approximately zero so that the clutching force (engagement) force of the frictional clutch 66 is controlled at the lowered (week) state. Therefore, the driving force transmitted to the first sprocket 68 via the frictional clutch 66 from the first output axle 44 becomes approximately zero. Consequently, the driving force is not transmitted to the second output axle 54, namely, the front road wheel side so that the vehicle is approximately in the rear road wheel two-wheel drive mode.

From the above-described state, as the difference $\Delta N$ in revolution speed between the front and rear road wheel revolutions becomes large, the on time duration in the duty ratio D becomes smaller. Accordingly, the clutch pressure Pc output from the clutch pressure regulating valve 122 is increased so that the clutching force (engagement force) of the frictional clutch 66 is increased. Consequently, the front left and right road wheels 12FL and 12FR are driven via the frictional clutch 66, the first sprocket 68, the chain 72, the second sprocket 70, the second output axle 54, the front road wheel side output axle 24, and front differential gear 26, and drive shaft 28 so that the vehicle is in the four-wheel drive state. Consequently, the front and rear road wheel torque distribution ratio is automatically modified from 0:100 to 50:50 according to the front and rear road wheel revolution difference $\Delta N$ so that the vehicle can assure a preferable running state.

On the other hand, suppose that a stacking phenomenon such that the road wheels are continued to be slipped on the low friction coefficient road with the vehicle stopped occurs with the vehicle run and with the 4H range selected through the sub transmission lever or the vehicle runs on a sandy road on which the stacking phenomenon is easy to occur. In this case, the vehicle is stopped and the selection lever of the automatic transmission 20 is placed at the neutral range or parking range with the sub transmission lever switched at the 4L range.

In this way, with the selection lever shifted in the N range or parking range, the input side and output side of the automatic transmission 20 are separated from each other so that the output axle, namely, the input axle 42 of the transfer 22 is freely revolvable. Immediately after the vehicle is stopped, the sub transmission lever is placed at the 4H range. However, when the processing shown in FIG. 11 is executed, since the microcomputer 7 determines that the vehicle is stopped at the step S37, the routine goes to the step S36 in which the electromagnetic switching valve 120 is switched to the operation position 120c. Thereby, the pilot switching valve 126 is switched to the operation position 126c so that the clutch pressure Pc supplied to the frictional clutch 66 is extinguished. Thus, the vehicle is returned to the two-wheel drive state, the driven wheels at this state being only the rear road wheels.

Hence, in this state, when the sub transmission lever is shifted from the 4H range to the neutral range (N), the meshed state between the spline hole $64b_1$ of the shift sleeve 64b and the high-speed gear shifting gear 64c formed on the input axle 42 is released so that the direct coupling state between the input axle 42 and first output axle 44 is decoupled (released).

On the other hand, when the sub transmission lever is shifted to the N range, the high-speed gear range position detection signal SH is in the off state. In place of it, the neutral position detection signal $S_N$ is in the on state. Therefore, when the interrupt routine shown in FIG. 10 is executed with the vehicle stopped, the routine advanced from the step S2 to the step S29 via the steps S20, S23, S24, S26, and S28. Therefore, without sensor diagnosis processing, the lamp indication of the neutral position N on the indicator 200 is carried out. In addition, when the clutch pressure control processing of- FIG. 11 is executed, the routine shown in FIG. 11 is transferred from the step S33 to the step S48 and to the step S36 since the vehicle is stopped. Consequently, the vehicle is continued at the two-wheel drive state.

In this way, since the vehicle is continued in the two-wheel drive state so that a separation between the first output axle 44 and the first sprocket 68 is carried out. Thus, both of the first output axle and the first sprocket are enabled to be relatively revolved. In this state, when the sub transmission lever is shifted from the N range to the 4L range, the shift sleeve 64b is moved toward the right-handed direction (as viewed from FIG. 2) via the control rod 64g and fork 64f along with the shift motion of the sub transmission lever. First, the right-handed end of the spline hole $64b_1$ is meshed with the four-wheel driving gear 80 formed on the first sprocket 68 and, subsequently, the outer tooth $64b_2$ formed on the flange $64a_2$ is meshed with the low-speed shifting gear 64d formed on the pinion carrier 62d of the sub transmission 62 so that the sub transmission 62 is shifted to the low-speed gear range position. At this time, as described above, since the first output axle 44 onto which the shift sleeve 64b is spline coupled is relatively revolvable to the first sprocket 68 on which the four-wheel driving gear 80, the meshing of the dog clutch constituted by the outer tooth $64b_2$ and the low-speed shifting gear 64d is smoothly carried out. In addition, for the meshing clutch constituted by the outer tooth $64b_2$ and the low-speed shifting gear 64d, the driving force from the engine 10 is not transmitted to the output axle of the automatic power transmission 20. Thus, the pinion carrier 62d is freely revolvable via the input axle 42, the sun gear 62a, and the pinion 62c. Consequently, the smooth mesh between the outer tooth $64b_1$ and the low-speed shifting gear 64d can be achieved.

Next, when the shift sleeve 64b is moved to the low-speed gear range position L, the low-speed gear range shift position detection signal $S_L$ of the low-speed gear range shift position sensor 88 is in the on state (generally the position sensors 86, 87, and 88 may be constituted by photo couples). When the clutch pressure control routine shown in FIG. 11 is executed, the interrupt routine goes to the step S35a via the step S34. Since the flag $F_{AL}$0 indicating the failure in the low-speed gear position sensor 88 is reset to zero, the routine goes to the step S36 in which the control signal $CS_0$ is turned off and the control signal $CS_1$ is turned on so that the vehicle is continued in the two-wheel drive mode.

With the sub transmission lever selected at the 4L range, the driving force of the output axle of the automatic power transmission 20 is reduced so that the revolution speed of the output axle thereof is reduced by means of the sub transmission 62 via the input axle 42 of the transfer 22, the speed-reduced driving force being transmitted to the shift sleeve 64b via the low-speed shifting gear 64d formed on the pinion carrier 62d and outer tooth $64b_2$ of the shift sleeve 64b. Thereafter, the driving force is transmitted from the shift sleeve 64b to the spline coupled first output axle 44. Finally, the driving force is transmitted to the second output axle 54 via the four-wheel driving gear 80 meshed with the spline hole $64b_1$, the first sprocket 68, the chain 72, and the second sprocket 70. The driving force transmitted to the input axle 42 is distributed to the first output axle 44 and second output axle 54 so that the vehicle is in the direct coupled, the four-wheel drive state. Consequently, an escaping run from the stacking phenomenon occurring vehicle road wheels state can become easy.

As described above, since, in the clutch pressure control routine shown in FIG. 11, the gear range shift position of the sub transmission 58 is determined according to whether the low-speed gear range position detection signal $S_L$ of the low-speed gear range shift position sensor 88 is in the on state or in the off state, the routine shown in FIG. 11 cannot be transferred from the step S34 directly to the step S37 when some abnormality occurs in the low-speed gear range shift position sensor 88 so that such an abnormality that the low-speed gear range shift position detection signal $S_L$ is continued in the on state regardless of the shift position of the shift sleeve 64b occurs. Consequently, such the clutch pressure control processing that the vehicle is in the four-wheel drive state as in the steps S37 through S44 cannot be executed.

However, in the embodiment, when the vehicle has started, the microcomputer 7 determines whether the low-speed gear range (shift) position detection signal $S_L$ is normally output in the gear range shift position diagnosis shown in FIG. 10. Hence, with the sub transmission lever selected at the 4H range and the shift sleeve 64b of the high-speed gear range position and low-speed gear range position switching mechanism 64 moved at the high-speed gear range position H, the estimated value $N_R'$ of the rear road wheel revolution speed based on the front road wheel side revolution speed value $N_F$, becomes larger than the actual rear road wheel revolution speed detection value $N_R$. Hence, at the step S6b, the high-speed gear range position determination H is stored (set) in the shift position memory region. Thereafter, since the low-speed gear range position detection signal $S_L$ is in the on state at the step S14, the routine goes to the step S15 and to the step S16 in which the flag $F_{LA}$ is set to "1" which indicates the failure in the low-speed gear range shift position sensor 88 and the warning lamp 202b is turned on. Hence, since the low-speed gear range position sensor failure indicating flag FLA is set to "1", the microcomputer 7 determines that the high-speed gear range position and low-speed gear range position switching mechanism 64 is switched to the high-speed gear range shift position H. Then, the routine advances to the step S37 so that the clutch pressure control based on the mode selected through the mode selection switch 90 can be executed. Consequently, the normal driving control state can be assured regardless of the on state failure of the detection signal $S_L$ of the low-speed gear range shift position sensor 88.

On the contrary, with the high-speed and low-speed gear range position switching mechanism 64 switched at the low-speed gear range shift position L but the low-speed gear range position detection signal $S_L$ is in the off state (failure condition), the interrupt routine shown in FIG. 10 is executed. At this time, since the front road wheel side revolution speed detection value $N_F$ is reduced according to a reduction gear ratio $\gamma_L$ between the low-speed shifting gear 64d of the high-speed and low-speed gear range switching mechanism 64 and outer tooth $64b_2$, the estimated value $N_R'$ of the rear road wheel side revolution speed calculated at the step S4 is smaller than the rear road wheel side revolution speed value $N_R$ detected by the rear road wheel side revolution speed sensor 98. Thus, the routine is transferred from the step S5 to the step S7 in which the count value C is incremented by one. If the count value C is below the set value Cs, the routine cannot be transferred from the step S8 to the step S9. Hence, the low-speed gear range position determination L is not set in the shift position memory region. Consequently, at the step S14, the microcomputer 7 determines that the low-speed gear range position detection signal $S_L$ is in the off state at the step S14. Even if the routine goes to the step S15b, the microcomputer 7 determines that $S_L$ (low-speed gear range position sensor 88) is normal. However, if the inequality of $N_R'<N_R$ is continued and the count value C has reached to the set value Cs, the routine shown in FIG. 10 is transferred from the step S8 to the step S9 in which the low-speed gear range position determination L is set in the shift position region. At this time, since the routine goes from the step S15b to the step S16, the low-speed gear range position abnormality flag $F_{LA}$ is set to "1" and the warning lamp 202b is turned on.

Therefore, when the clutch pressure control routine shown in FIG. 11 is executed, the microcomputer 7 has deemed that the shift sleeve 64b is moved to the low-speed gear range position L and the routine is transferred from the step S34 via the step S35b to the step S36 so that the clutch pressure Pc is maintained at the same pressure as the atmospheric pressure.

It is noted that in the case where the high-speed gear range position sensor 88 has failed, the abnormality (warning) lamp 202a is turned on with the routine passed through the step S12a or 12b shown in FIG. 10 (also the flag $F_{HA}$ may be set to "1".

Furthermore, in the shift position sensor diagnosis processing in FIG. 11, when only either of the revolution speed values $N_F$ or $N_R$ of the front road wheel side revolution speed sensor 96 or the rear road wheel side revolution speed sensor 98 are zeroed during the vehicle run, either of the revolution speed sensors which outputs zero is determined to be failed. Then, the corresponding warning lamp 202d or 202c at either of the step S31 or S32 is turned on to inform the driver of the failure in the corresponding revolution speed sensor 96 or 98. In this case, no shift position diagnosis is carried out and the diagnosis processing is ended.

The following advantages can be achieved in the preferred embodiment of the transfer apparatus according to the present invention.

A) The high-speed gear range shift position and low-speed gear range shift position in the high-speed gear range position and low-speed gear range position switching mechanism 64 in the sub transmission 58 can be estimated on the basis of the revolution speed $N_R$ of the input axle of the sub transmission 58 detected by the rear road wheel side revolution speed sensor 98 and the revolution speed $N_F$ of the second output axle 54 detected by the front road wheel side revolution speed sensor 96. The abnormal state (failure) of either or both of the gear range shift position sensors 86 and 88 can be monitored on the basis of estimated values of the high-speed gear range position and the low-speed gear range position. New other special sensors are not needed to be additionally installed for these monitoring. A preferable sensor diagnosing function can be achieved.

Especially, when the low-speed gear range position sensor 88 is in the on state with the high-speed gear range position and low-speed gear range position switching mechanism 64 placed at the gear range shift position other than the low-speed gear range position L, this abnormal state is detected so that the normal driving force control on the basis of the high-speed gear range shift position H estimated on the basis of the front road wheel side revolution speed detection value $N_F$ and the rear road wheel side revolution speed detection value $N_R$ can be carried out. Consequently, a preferable fail safe function can be achieved.

B) When the low-speed gear range position detection signal $S_L$ is continued in the on state representing the low-speed gear range position L even though the shift sleeve 64b is actually not placed at the low-speed gear range shift position L, the clutch pressure control is carried out according to the selected mode through the mode selection switch 90. Even if the on abnormality in the low-speed gear range position detection signal $S_L$ is generated, the four-wheel drive state can be secured. In addition, during the vehicular stop, the routine is transferred to the step S36 via either of the step S37 or S48 regardless of the shift position of the high-speed and low-speed gear range position switching mechanism 64. The clutch pressure for the frictional clutch 66 is zeroed (no pressure state) Thus, the operativeness of switching from the neutral position N to the low-speed gear range position L in the high-speed and low-speed switching mechanism 64 can be improved.

C) In a case where the mode selection switch 90 is operated to select the two-wheel drive mode from either of the four-wheel drive automatic mode or the four-wheel drive lock mode, the clutch pressure control processing shown in FIG. 11 is executed. At this time, the routine goes to the step S45 via the steps S38 and S43. Then, the switching flag F is set to "1". Thus, from the next processing of FIG. 11, the routine, in turn, is transferred from the step S32 to the step S47. The four-wheel drive state is maintained with the controlled state using the duty ratio D immediately before the vehicular stop detection at the step S48 provided that the two-wheel drive mode selection is continued. Therefore, the switching of the drive mode from the four-wheel drive mode to the two-wheel drive mode during the vehicular run can be prevented. Consequently, a steering characteristic variation in the vehicular steering system can be suppressed and a steering stability can be assured.

It is noted that in the embodiment the gear range shift position of the sub transmission 62 is estimated (determined) on the basis of the detection values on the revolution speed of the front road wheel side revolution speed sensor 86 and the rear road wheel side revolution speed sensor 88 and the failure in the shift position sensor 86 or 88 is detected on the basis of the estimated shift position.

Alternatively, with the gear range shift position sensor 86 or 88 omitted, the determination at the step S34 shown in FIG. 11 is carried out on the basis of the estimated values of the shift positions in the sub transmission 58, the estimated values of the shift positions being based on the revolution speed detection values of the front road wheel side revolution speed sensor 86 and rear road wheel side revolution speed sensor 88 so that the clutch pressure control can be carried out.

In this case, since the gear range shift position sensors 86 and 88 are not needed, the number of parts can be reduced and the cost can be reduced. In addition, the revolution speed sensor disposed on the output axle of the automatic power transmission 20 can be used as the rear road wheel side revolution speed sensor 98. The number of parts constituting the transfer apparatus can accordingly be reduced and the cost can accordingly be reduced.

In the embodiment, the power transmission is the automatic power transmission 20. Alternatively, a manual power transmission may be used in place of the automatic power transmission.

In the embodiment, when the electromagnetic switching valve 120 does not receive the power supply, the vehicle is in the four-wheel drive state. When the electromagnetic switching valve 120 receives the power supply, the vehicle is in the two-wheel drive state. However, alternatively, if the normal position 120b of the electromagnetic switching valve 120 is replaced with the operation position of the electromagnetic valve 120, the two-wheel drive state with no power supply to the valve 120 and the four-wheel drive state with the power supply to the valve 120 can be achieved.

Figure 12:
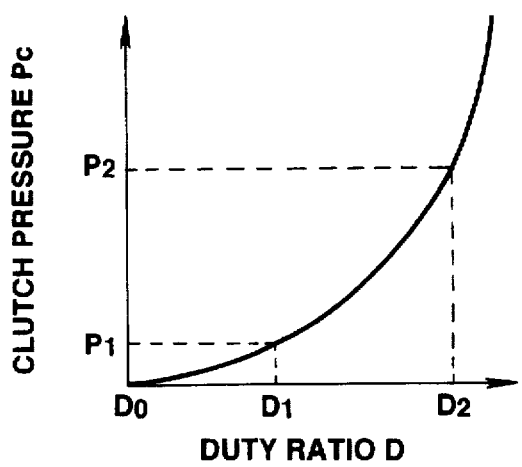
FIG. 12 is another control characteristic representing the relationship between the duty ratio D and the clutch pressure Pc as a modification of FIG. 9.

In the same way, alternatively, if the normal position 128b of the duty ratio control electromagnetic valve 128 is replaced with the operation position 128c thereof and the control characteristic graph shown in FIG. 9 is modified to that shown in FIG. 12, the same operation as described in the embodiment can be achieved.

Furthermore, in the embodiment, the mode selection switch 90 is operated to select the two-wheel drive mode and the four-wheel drive mode and the sub transmission lever is operated to mechanically operate the high-speed and low-speed gear range position switching mechanism 64 in the sub transmission 62. Alternatively, the sub transmission lever may add the 2H range which selects the two-wheel drive state in addition to the 4H range and 4L range and the switching operation of the sub transmission lever permits the switching between the two-wheel drive and four-wheel drive.

In addition, in the embodiment, the high-speed and low-speed switching mechanism 64 in the sub transmission 62 is mechanically shifted. However, alternatively, a motor may newly be installed to actuate the shift sleeve 64b of the high-speed gear range position and low-speed gear range position switching mechanism 64, the motor serving to slide the shift sleeve 64b.

In the embodiment, the pilot control pressure of the clutch pressure regulating valve 122 is formed by applying the duty ratio control electromagnetic valve 128. Alternatively, an electromagnetic proportional pressure control valve whose output pressure is adjustable according to a value of the exciting current supplied to the solenoid thereof may be applied in place of the electromagnetic valve 128.

In this alternative case, the driver 31a may be constituted by, for example, a floating type constant voltage circuit so that the exciting current $i_0$ having the current value which is in accordance with a voltage value of the input control signal $CS_0$.

Finally, in the embodiment, the present invention is applicable to the rear road wheel drive based four-wheel drive vehicle. However, the present invention is also applicable to a front road wheel drive based four-wheel drive vehicle.

What is claimed is:

1. A driving force transfer apparatus for a four-wheel drive vehicle, comprising:
   a) a power transmission associated with a vehicular engine;
   b) an input axle connected to an output axle of said power transmission;
   c) a first output axle connected toward mainly driven road wheels of the vehicle;
   d) a second output axle connected toward secondarily driven road wheels of the vehicle;
   e) a sub transmission having a low-speed gear range position and high-speed gear range position switching mechanism and which is so arranged and constructed as to transmit a driving force transmitted from said power transmission to said first output axle through mesh clutching means provided in said low-speed gear range position and high-speed gear range position switching mechanism;
   f) a two-wheel-to-four-wheel drive switching mechanism having a frictional clutch and which is so arranged and constructed as to provide a clutching force for said frictional clutch so that said second output axle is coupled to said first output axle, the clutching force of said frictional clutch being varied according to a magnitude of clutch pressure applied to said frictional clutch;
   g) revolution speed difference detecting means for detecting a difference in revolution speed between the mainly driven and secondarily driven road wheels; and
   h) clutching force controlling means for controlling the clutch pressure applied to said frictional clutch so that the clutching force of said frictional clutch is varied on the basis of the difference in revolution speed between the mainly driven and secondarily driven road wheels detected by said revolution speed difference detecting means, wherein said revolution speed difference detecting means comprises:
   i) first output axle revolution speed detecting means for detecting a revolution speed of an input axle of said sub transmission and outputting a first signal indicative of the revolution speed of said input axle of said sub transmission as a first output axle revolution speed indicative signal;
   j) second output axle revolution speed detecting means for detecting a revolution speed of said second output axle and outputting a second signal indicative of the revolution speed of said second output axle, and which further includes a high-speed gear range position and low-speed gear range position determining means for determining whether the sub transmission is in a state of either of a high-speed gear range or low-speed gear range position on the basis of values of said first and second signals output from said first and second output axle revolution speed detecting means.

2. A driving force transfer apparatus for a four-wheel drive vehicle as claimed in claim 1, which further comprises:
   k) first position detecting means for detecting whether the sub transmission is in the state of the high-speed gear range position and outputting a third signal when detecting that the sub transmission is in the high-speed gear range position;
   l) second position detecting means for detecting whether the sub transmission is in the state of the low-speed gear range position and outputting a fourth signal when detecting that the sub transmission is in the low-speed gear range position;
   m) first abnormality diagnosing means for comparing the result of determination by said high-speed gear range position and low-speed gear range position determining means that the sub transmission is in the state of the high-speed gear range position with the third signal and outputting a first warning signal indicating that said first position detection means has failed when both of the compared determination and third signal are not coincident with each other; and
   n) second abnormality diagnosing means for comparing the result of determination by said high-speed gear range position and low-speed gear range position determining means that the sub transmission is in the state of the low-speed gear range position with the fourth signal and for outputting a second warning signal indicating that said second position detecting means has failed when both of the result of determination by said low-speed gear range position and the fourth signal are not coincident with each other.

3. A driving force transfer apparatus for a four-wheel drive vehicle as claimed in claim 2, which further comprises:
   o) fail safe means for forcing said clutching force controlling means into an operation state thereof when either of said first and second abnormality diagnosing means outputs a corresponding one of either of the first warning signal or second warning signal.

4. A driving force transfer apparatus for a four-wheel drive vehicle as claimed in claim 3, which further comprises:
   p) vehicle stopped state detecting means for detecting whether the vehicle has stopped; and
   q) releasing means for releasing the operation state of said clutching force controlling means by said fail safe means.

5. A driving force transfer apparatus for a four-wheel drive vehicle as claimed in claim 4, wherein said high-speed gear range position and low-speed gear range position determining means comprises: calculating means for calculating an estimated value of the first output axle revolution speed $N_R'$ in a low-speed gear range position and four-wheel drive range (4L) of the sub transmission on the basis of a value of said second signal $N_F$ of the second output axle revolution speed detecting means; comparing means for comparing the estimated value $N_R'$ of the first output axle revolution speed with the value of the first signal $N_R$ of the first output axle revolution speed detecting means so as to determine whether the sub transmission is in the state of the high-speed gear range position; and storing means for storing the high-speed range position determination H in a given memory area when a result of comparison indicates as $N_R' \geq N_R$.

6. A driving force transfer apparatus for a four-wheel drive vehicle as claimed in claim 5, wherein said first abnormality diagnosing means outputs the first warning signal when the result of the comparison indicates $N_R' \geq N_R$, the third signal indicating the high-speed gear range position is output, and the high-speed gear range position determination H is not stored.

7. A driving force transfer apparatus for a four-wheel drive vehicle as claimed in claim 6, wherein said first abnormality diagnosing means outputs the first warning signal when the result of the comparison indicates $N_R' \geq N_R$, the third signal indicating the high-speed gear range position is not output, and the high-speed gear range position determination H is stored.

8. A driving force transfer apparatus for a four-wheel drive vehicle as claimed in claim 7, wherein said high-speed gear range position and low-speed gear range position determining means further comprises: counting means for counting a predetermined period of time when the result of comparison indicates $N_R' < N_R$; and storing means for storing the low-speed gear range position determination L in another memory area when the counted predetermined time has passed from a time at which the result of comparison indicates $N_R' < N_R$.

9. A driving force transfer apparatus for a four-wheel drive vehicle as claimed in claim 8, wherein said second abnormality diagnosing means outputs the second warning signal when the fourth signal indicating that the sub transmission is in the state of the low-speed gear range position is not output and the low-speed gear range position determination L is stored in the other memory area or vice versa.

10. A driving force transfer apparatus for a four-wheel drive vehicle as claimed in claim 9, which further comprises: neutral position detecting means for detecting whether the sub transmission is actually in a neutral state between the high-speed gear range position and low-speed gear range position and outputting a fifth signal indicating that the sub transmission is in the neutral state; and third abnormality diagnosing means for comparing the result of determination by said high-speed gear range position and low-speed gear range position determining means with the fifth signal and outputting a third warning signal indicating that both of the result of determination by said high-speed gear range position and low-speed gear range position determining means do not coincide with each other.

11. A driving force transfer apparatus for a four-wheel drive vehicle as claimed in claim 10, wherein said third abnormality diagnosing means carries out a diagnosis for the neutral position detecting means after said first and second abnormality diagnosing means carry out the diagnosis for the first and second position detecting means.

12. A driving force transfer apparatus for a four-wheel drive vehicle as claimed in claim 11, which further comprises, fourth abnormality diagnosing means for determining whether the second signal indicating the second output axle revolution speed is zero when the first signal indicating the first output axle revolution speed indicates a value exceeding zero and outputting a fourth warning signal when determining that the second signal is zero when the first signal indicates the value exceeding zero; and fifth abnormality diagnosing means for determining whether the second signal is zero when the first signal indicates the value exceeding zero and outputting a fifth warning signal when determining that the second signal is zero when the first signal indicates the value exceeding zero.

13. A driving force transfer apparatus for a four-wheel drive vehicle as claimed in claim 12, which further comprises a plurality of warning lamps, each warning lamp being turned on when any corresponding one of the first, second, third, fourth, and fifth warning signals are output.

14. A driving force transfer apparatus for a four-wheel drive vehicle as claimed in claim 13, wherein said calculating means calculates the estimated value $N_R'$ of the first output axle revolution speed as follows:

$N_R' = N_F \cdot \gamma_L - \alpha$, wherein $N_F$ denotes the value of the second signal indicating the second output axle revolution speed, $\gamma_L$ denotes a gear ratio in the four-wheel drive low-speed gear range position, and $\alpha$ denotes a constant with a measurement error for the second output axle revolution speed taken into consideration.

15. A driving force transfer apparatus for a four-wheel drive vehicle as claimed in claim 14, wherein said counted predetermined period of time is approximately twenty seconds.

16. A driving force transfer apparatus for a four-wheel drive vehicle as claimed in claim 15, wherein said fail safe means comprises: first determining means for determining whether the sub transmission is switched into a four-wheel drive lock mode; second determining means for determining whether the neutral position detecting means outputs the fifth signal indicating that the sub transmission is in the neutral state when the first determining means determines that the sub transmission is in the neutral state when the first determining means determines that the sub transmission is switched into the four-wheel drive lock mode; third determining means for determining whether the fourth signal indicating that the sub transmission is in the state of the low-speed gear range position is output when said second determining means determines that the fifth signal is not output; fourth determining means for determining whether a flag ($F_{LA}$) indicating whether the second warning signal is output is set to "1" so that the second position detecting means has failed when said third determining means determines that the fourth signal is output, and wherein said fail safe means forces said clutching force controlling means into the operation state when said fourth determining means determines that the flag ($F_{LA}$) is set to "1" although the fourth signal ($S_L$) is output.

17. A driving force transfer apparatus for a four-wheel drive vehicle as claimed in claim 16, wherein said clutching force controlling means is responsive to a command from said fail safe means to be forced into the operation state and wherein said clutching force controlling means comprises: revolution speed difference calculating means for calculating a difference in revolution speed between the first signal value $N_R$ indicating the revolution speed of the first output axle and the second signal value $N_F$ indicating the revolution speed of the second output axle; duty ratio deriving means for deriving a duty ratio D according to the calculated revolution speed difference ($\Delta N = N_R - N_F$); and clutch pressure regulating means for determining a clutch pressure Pc supplied to the frictional clutch according to the derived duty ratio D, the clutching force of the frictional clutch being varied according to the magnitude of the clutch pressure Pc.

18. A driving force transfer apparatus for a four-wheel drive vehicle as claimed in claim 17, wherein said vehicle stopped state detecting means comprises fifth determining means for determining whether both of the first output axle revolution speed $N_R$ and the second output axle revolution speed $N_F$ are zero.

19. A driving force transfer apparatus for a four-wheel drive vehicle as claimed in claim 18, wherein when said fifth means determines that both of the revolution speeds of the first output axle and the second output axle are zero, the clutching force controlling means is set in a two-wheel drive state so as to release the operation of the clutching force controlling means.

20. A driving force transfer apparatus for a four-wheel drive vehicle as claimed in claim 19, wherein said mainly driven road wheels are rear left and right road wheels, and said secondarily driven road wheels are front left and right road wheels.

21. A driving force transfer apparatus for a four-wheel drive vehicle having a power transmission associated with a vehicular engine, said driving force transfer apparatus comprising:

a) a first output axle connected toward mainly driven road wheels;

b) a second output axle connected toward secondarily driven road wheels;

c) a sub transmission having a low-speed gear range position and high-speed gear range position switching mechanism and a mesh clutching mechanism, said sub transmission transmitting a driving force from said power transmission to said first output axle through said mesh clutching mechanism provided in said low-speed gear range position and high-speed gear range position switching mechanism;

d) a two-wheel-to-four-wheel drive switching mechanism having a frictional clutch, said two-wheel-to-four-wheel drive switching mechanism providing a clutching force for said frictional clutch so that said second output axle is coupled to said first output axle, the clutching force of said frictional clutch being varied according to a magnitude of clutch pressure applied to said frictional clutch;

e) a first output axle revolution speed sensor arranged for detecting a revolution speed of an input axle of said sub transmission and outputting a first signal indicative of the revolution speed of said input axle of said sub transmission as a first output axle speed indicative signal;

f) a second output axle revolution speed sensor arranged for detecting a revolution speed of said second output axle of said sub transmission and outputting a second signal indicative of the revolution speed of said second output axle of said sub transmission as a second output axle speed indicative signal; and g) a controller arranged for deriving a difference in revolution speed between the first and second output signals of the first and second output axle revolution speed sensors for controlling the clutch pressure applied to said frictional clutch so that the clutching force of said frictional clutch is varied on the basis of the derived difference in revolution speed, and for determining whether the sub transmission is in a state of either of a high-speed gear range of low-speed gear range position on the basis of values of the first and second signals of the first and second output axle revolution speed sensors.

22. A driving force transfer apparatus for a four-wheel drive vehicle, comprising:

a) a power transmission associated with a vehicular engine;

b) an input axle connected to an output axle of said power transmission;

c) a first output axle connected toward mainly driven road wheels of the vehicle;

d) a second output axle connected toward secondarily driven road wheels of the vehicle;

e) a sub transmission having a low-speed gear range position and high-speed gear range position switching mechanism, said sub transmission being so arranged and constructed as to transmit a driving force transmitted from said power transmission to said first output axle through a mesh clutching mechanism provided in said low-speed gear range position and high-speed gear range position switching mechanism;

f) a two-wheel-to-four-wheel drive switching mechanism having a frictional clutch, said two-wheel-to-four-wheel drive switching mechanism being so arranged and constructed as to provide a clutching force for said frictional clutch so that said second output axle is coupled to said first output axle, the clutching force of said frictional clutch being varied according to a magnitude of clutch pressure applied to said frictional clutch;

g) a revolution speed difference detector configured to detect a difference in revolution speed between the mainly driven and secondarily driven road wheels; and h) a clutching force controller configured to control the clutch pressure applied to said frictional clutch so that the clutching force of said frictional clutch is varied on the basis of the difference in revolution speed between the mainly driven and secondarily driven road wheels detected by said revolution speed difference detector, wherein said revolution speed difference detector comprises:

i) a first output axle revolution speed detector configured to detect an input axle of said sub transmission as a first output axle revolution speed indicative signal;

j) a second output axle revolution speed detector configured to detect a revolution speed of said second output axle and to output a second signal indicating the revolution speed of said second output axle, and which further includes a high-speed gear range position and low-speed gear range position determiner configured to determine whether the sub transmission is in a state of either of a high-speed gear range or low-speed gear range position on the basis of values of said first and second signals output from said first and second output axle revolution speed detectors.

* * * * *